US012712757B2

(12) United States Patent
Barrenscheen

(10) Patent No.: US 12,712,757 B2
(45) Date of Patent: Aug. 18, 2026

(54) FAST SERIAL DATA COMMUNICATIONS

(71) Applicant: Infineon Technologies AG, Neubiberg (DE)

(72) Inventor: Jens Barrenscheen, Munich (DE)

(73) Assignee: Infineon Technologies AG (DE)

( * ) Notice: Subject to any disclaimer, the term of this patent is extended or adjusted under 35 U.S.C. 154(b) by 175 days.

(21) Appl. No.: 18/824,294

(22) Filed: Sep. 4, 2024

(65) Prior Publication Data

US 2026/0067126 A1 Mar. 5, 2026

(51) Int. Cl.
*H04L 12/40* (2006.01)

(52) U.S. Cl.
CPC .................................... *H04L 12/40* (2013.01)

(58) Field of Classification Search
CPC ....................................................... H04L 12/40
USPC ........................................................... 375/257
See application file for complete search history.

(56) References Cited

U.S. PATENT DOCUMENTS

2022/0358077 A1* 11/2022 Jansen ................ G06F 13/4282

* cited by examiner

*Primary Examiner* — Fitwi Y Hailegiorgis
(74) *Attorney, Agent, or Firm* — Mueting Raasch Group

(57) ABSTRACT

A serial communications device alternates between triggering the shifting out of an SDO bit and triggering the shifting in of an SDI bit relative a first shift clock edge and a second shift clock edge of a shift clock signal SCLK that are separated by a first time difference. The serial communication device is further configured to trigger the shifting in of the SDI bit separated from triggering the shifting out of the SDO bit by a second time difference that is longer than the first time difference.

31 Claims, 19 Drawing Sheets

Peripheral Node 120

Baud Rate and CS Receive 123

Receiver 126

Receive Buffer 127

Transmitter 124

Transmit Buffer 125

SDI

SDO

CS

SCLK

MOSI

MISO

SDO

SDI

Baud Rate and CS Generate 113

Transmitter 114

Transmit Buffer 115

Receiver 116

Receive Buffer 117

Host Node 110

1001

Alternating between triggering the shifting out of an SDO data bit and triggering the shifting in of an SDI data bit relative to a first shift clock edge separated from a second shift clock edge of a shift clock signal SCLK by a first time difference.

1002

Triggering the shifting in of the SDI data bit separated from triggering the shifting out of the SDO data bit by a second time difference that is longer than the first time difference.

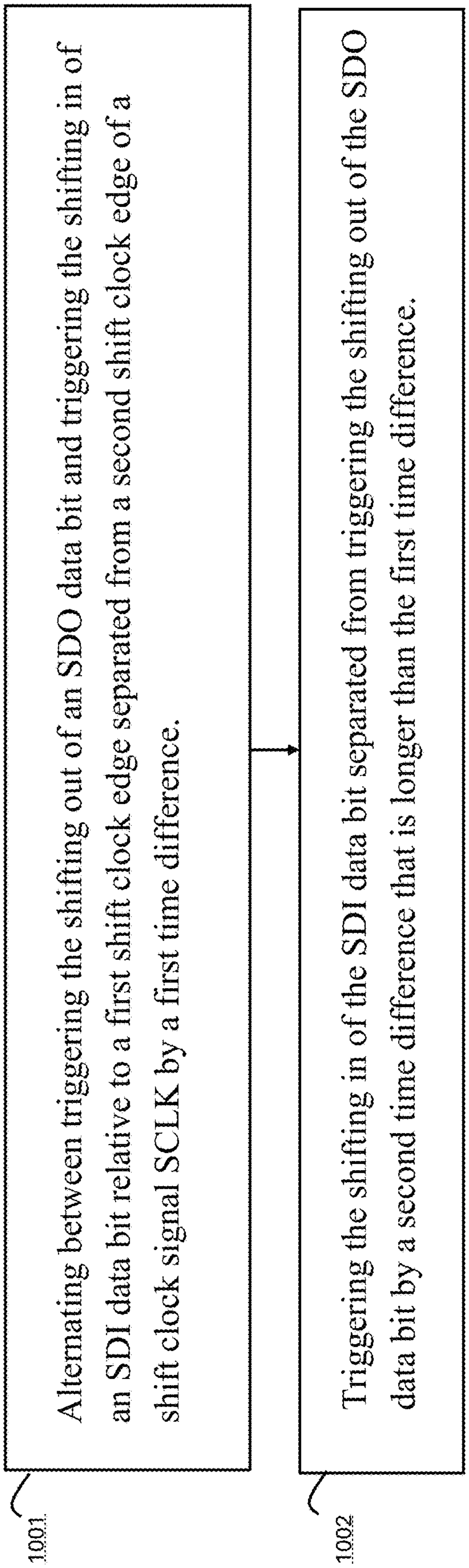

FIG. 10

FAST SERIAL DATA COMMUNICATIONS

TECHNICAL FIELD OF THE INVENTION

This invention relates generally to communications systems, and more specifically to serial data communications.

BACKGROUND

In some applications, it may be beneficial to employ relatively low cost and/or low power communications systems. One example of such a communications system is a serial communications system in which bits of data are exchanged sequentially to communicate between different nodes.

In some examples, signals between nodes of a communications system may be received by a recipient node at a later time than signal was sent by a transmitting due to a propagation delay introduced by a communications path between the respective nodes. In some examples, a speed at which such a serial communications system can operated is limited by the propagation delay imposed on signals exchanged between nodes.

SUMMARY

This disclosure is directed to improvements in serial data communications, specifically to enable serial data communications at faster speeds than in comparison to traditional systems. For example, a method is described. The method includes alternating between triggering shifting out of an SDO bit and triggering shifting in of an SDI bit relative to a first shift clock edge separated from a second shift clock edge of a shift clock signal SCLK by a first time difference. The method further includes triggering the shifting in of the SDI bit separated from triggering the shifting out of the SDO bit by a second time difference that is longer than the first time difference.

According to another example, a communications device is described. The communications device is configured to alternate between triggering shifting out of an SDO bit and triggering shifting in of an SDI bit relative to a first shift clock edge separated from a second shift clock edge of a shift clock signal SCLK by a first time difference. The communications device is further configured to trigger the shifting in of the SDI bit separated from triggering the shifting out of the SDO bit by a second time difference that is longer than the first time difference.

According to another example, a system is described that includes a host node and a peripheral node. The peripheral node is configured to alternate between triggering shifting out of an SDO bit and triggering shifting in of an SDI bit relative the first shift clock edge and the second shift clock edge. The peripheral node is further configured to trigger the shifting in of the SDI bit separated from triggering the shifting out of the SDO bit by a second time difference that is longer than the first time difference.

BRIEF DESCRIPTION OF THE DRAWINGS

FIG. 10 is a flow diagram that depicts one example of a method of operating a serial communications node according to some embodiments.

DETAILED DESCRIPTION

Figure 1:
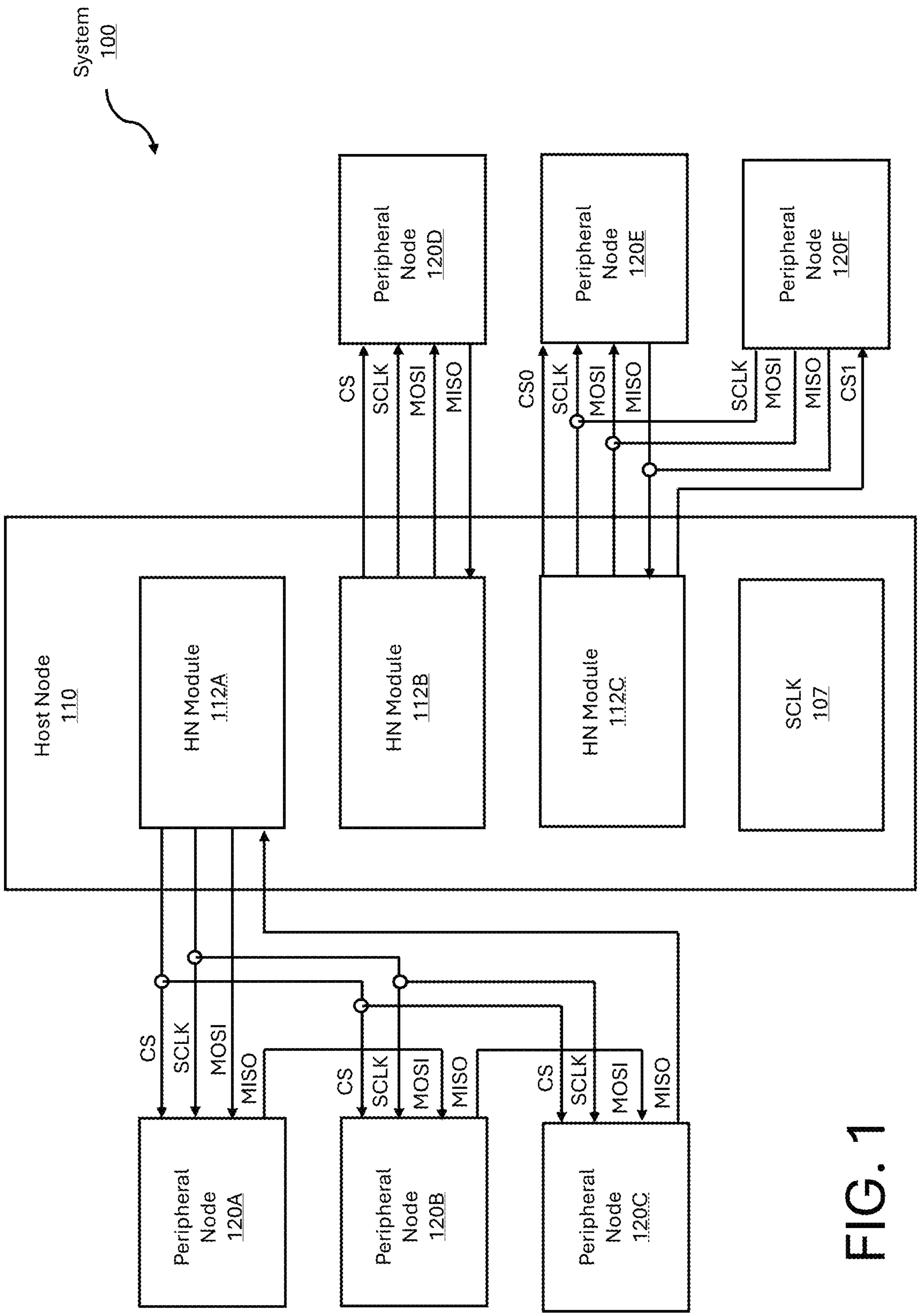
FIG. 1 is a block diagram depicting a host node coupled to communicate with a plurality of peripheral nodes according to some embodiments.

FIG. 1 is a block diagram depicting a host node 110 coupled to communicate with a plurality of peripheral nodes 120A-120F according to some embodiments. The host node 110 may be configured to control communications with the respective peripheral nodes 120A-120F. For example, the host node 110 be a processing component, such as a microcontroller, that operates as a main controller to distributed components of a vehicle system by communicating with peripheral nodes 120A-120F. As non-limiting examples, the host node 110 may include one or more microprocessor, graphics processor (GPU), reduced instruction set (RISC) processor(s), or any other processing component configured to control communications with peripheral nodes 120A-120F.

As a non-limiting example, the host node 110 may communicate with the peripheral nodes 120A-120F to control the supply of energy to a motor of the vehicle such as an electric or hybrid drivetrain motor, a braking system actuator, a door or brake locking mechanism, window controls, or other motor or actuator used in a vehicle. In other non-limiting examples, the host node 110 may communicate with the peripheral nodes 120A-120F to control a lighting system of the vehicle, for example to control interior or exterior vehicle lighting systems.

As shown in FIG. 1, host node 110 is coupled to a shift clock module 107 configured to generate a shift clock signal "SCLK," which is sent to each peripheral node 120A-120F and used to operate system 100 in synchronization. In the embodiment depicted in FIG. 1, the peripheral nodes 120A-120F are configured as serial peripheral interface (SPI) nodes that are each coupled to the host node 110 through four signals: a chip select (CS) signal, a shift clock signal (SCLK), a Master Out Slave In (MOSI) signal, and a Master In Slave Out (MISO) signal, each of which is coupled to analogous I/O ports of the host node 110. While only one transmission line is shown representing each of these signals, in some embodiments, each may represent multiple signals. For example, system 100 may be implemented such that each peripheral node is coupled to multiple MOSI signals and multiple MISO signals in parallel. In other embodiments not depicted, the peripheral nodes 120A-120F may be coupled through one or more other signals used in different serial data communications topologies.

To communicate, the host node 110 and peripheral nodes 120A-120F exchange messages by shifting in and out MOSI and MISO bits based on the shift clock signal SCLK. The shift clock signal SCLK includes a first type of signal edges that trigger a shifting in of MISO data bits and a second type of signal edges that trigger the shifting out of MOSI data bits. For example, the host node 110 may generate a message directed to one or more peripheral nodes that includes a plurality of MOSI bits, and receive a message from the same, or a different peripheral node that includes the same number of MISO bits. To communicate, the host node 110 generates the shift clock signal SCLK to indicate alternating between shifting in a MISO bit and shifting out a MOSI bit responsive to successive edges of the shift clock signal.

According to the example of FIG. 1, host node 110 includes a plurality of Host Node (HN Modules 112A-112C, which each represent a different communications topology that may be used to communicatively couple the host node 110 to the respective peripheral nodes 120A-120F. The examples of FIG. 1 are provided for explanatory purposes and are intended to be non-limiting. In some examples, system 100 may include more (i.e., up to 10 peripheral nodes), or in some cases many more peripheral nodes than depicted. According to these examples, the host node 110 be coupled to communicate with the peripheral nodes according to any of the depicted various topologies depicted in FIG. 1, alone or in combination.

As one example, HN module 112B is coupled to a peripheral node 120D in a peer-to-peer topology. According to this example, the host node 110 and the peripheral node 120D communicate directly through CS, MOSI, MISO, and SCLK signals coupled between the host node 110 and the peripheral node 120D.

As another example, HN module 112C is coupled to a pair of peripheral nodes 120E and 120F in a star topology. As shown in FIG. 1, according to the star topology, HN module 112C is coupled through the same SCLK, MOSI, and MISO signals to multiple peripheral nodes 120E and 120F, and each of the multiple peripheral nodes is selectable via dedicated chip select signals CS0 and CS1 coupled to the respective peripheral nodes 120E and 120F. To communicate in the star topology, the HN module 112C shifts out MOSI bits that are received by the multiple peripheral nodes 120E, 120F, and the respective chip select signals indicate which of the peripheral nodes 120E, 120F are the intended recipient of the MOSI bits. In the star topology, a selected peripheral node of peripheral nodes 120E and 120F shifts out MISO bits to the host node 110.

As another example, HN module 112A is coupled to peripheral nodes 120A-120C in a daisy-chain topology. According to the daisy chain topology depicted in FIG. 1, the host node 110 is coupled to peripheral nodes 120A and 120C at respective ends of the daisy chain topology with for example another peripheral node 120B between the first peripheral node 120A and the last peripheral node 120C of the daisy chain where the daisy chain includes more than two peripheral nodes. For example, as shown in FIG. 1, HN module 112A is coupled through a MOSI signal with a first peripheral node 120A, and with a MISO signal with last peripheral node 120C of the daisy chain topology.

As shown in FIG. 1, the HN module 112A includes chip select CS and SCLK signals coupled to each of peripheral nodes 120A-120C. The HN module 112A is coupled through a MOSI signal to an input of peripheral node 120A. A MISO output of the peripheral node 120A is coupled to a MOSI input of peripheral node 120B. The MISO output of the peripheral node 120B is coupled to a MOSI input of peripheral node 120C, and the MISO output of peripheral node 120C is coupled to the HN module 112A.

To communicate using the daisy-chain topology, HN module 112A may send messages to peripheral nodes 120A-120C through other nodes of the daisy chain. A message sent out by the host node 110 may include data segment(s) (one or more bits of data) directed to each of the respective peripheral node(s) 120A-120C. As one non-limiting example, the HN module 112A may first activate the CS signal indicating that a message is being transferred, then shift out a data segment for peripheral node 120C, followed by a data segment for peripheral node 120B, followed by a data segment for peripheral node 120A. Peripheral node 120A may receive the message as MOSI bits from the HN module 112A, output a data segment followed by the received MOSI bits as MISO bits to peripheral node 120B, and store data segment(s) for peripheral node 120A when the message is completed. Peripheral node 120B may receive the message as MOSI bits from the peripheral node 120A, output a data segment followed by the received MOSI bits as MISO bits to peripheral node 120C and store data segment(s) for peripheral node 120B when the message is completed. Peripheral node 120C may receive the message as MOSI bits from the peripheral node 120B, and store data segment(s) for peripheral node 120C when the message is completed. The host node 110 may then deactivate the CS signal to indicate to the peripheral nodes 120A-120C that the message transmission is completed. According to the daisy chain topology, peripheral nodes 120A-120C may also send output data segments to the host node 110 and/or other peripheral nodes 120A-120C based on the shift clock signal SCLK generated by the host node 110 in a similar manner.

As mentioned above, the example of host node 110 configured to communicate with peripheral nodes 120A-120F using a SPI communications protocol in FIG. 1 is provided for explanatory purposes only, and in other examples, other serial data communications protocols may be used. Accordingly, in some examples, the host node 110 may be described as configured to shift out serial data out (SDO) bits (e.g., MOSI bits), and shift in serial data in (SDI) bits (e.g., MISO bits). Similarly, peripheral nodes 120A-120C may be described as configured to shift out SDO bits (e.g., MISO bits), and shift in SDI bits (e.g., MOSI bits).

Figure 2:
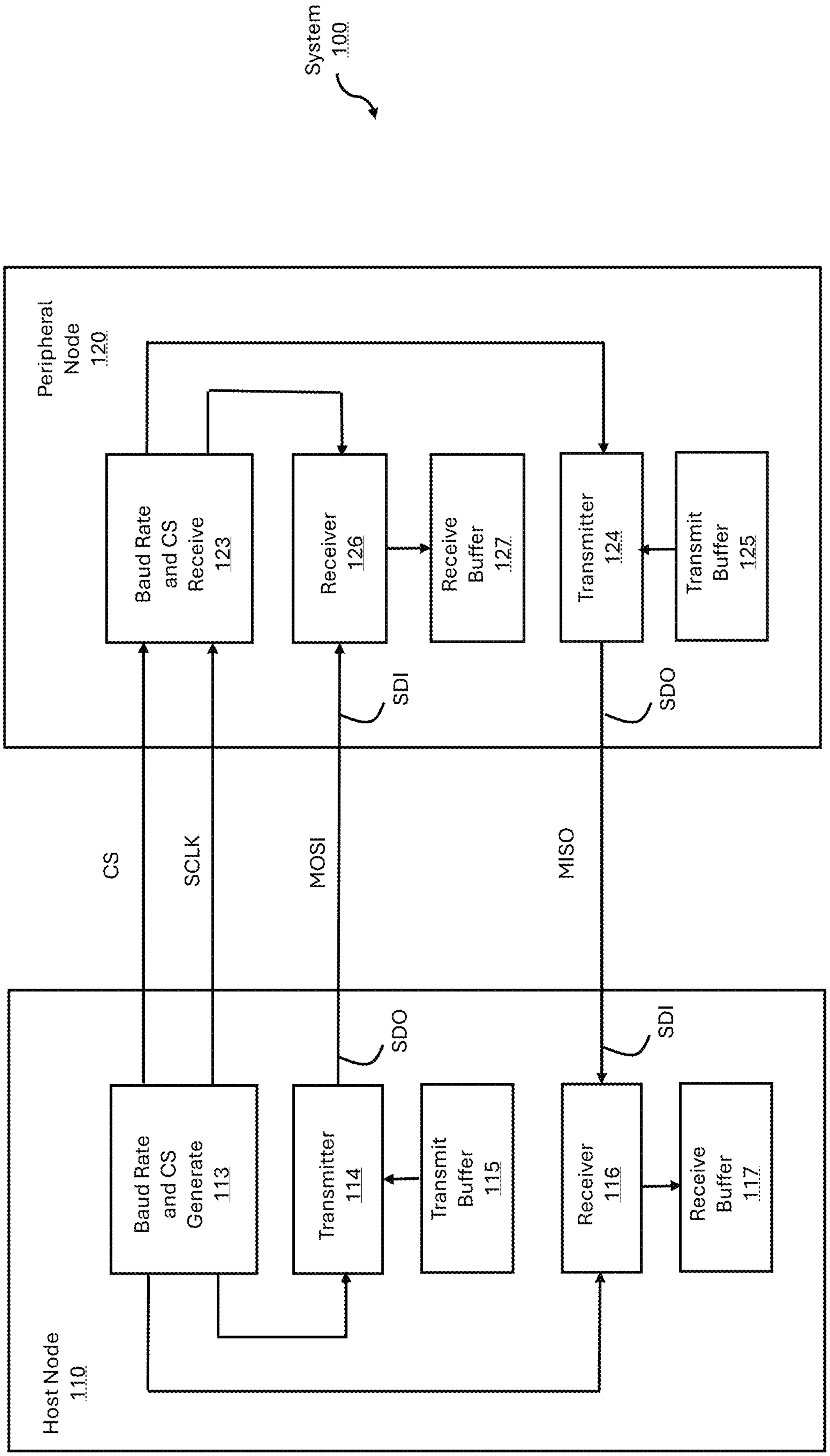
FIG. 2 is a block diagram that depicts one example of a host node coupled to communicate with a peripheral node according to some embodiments.

FIG. 2 is a block diagram that depicts one example of a host node 110 coupled to communicate with a peripheral node 120 according to some embodiments. In the example of FIG. 2, the host node 110 and peripheral node 120 are coupled to one another according to a serial peripheral interface (SPI) protocol through a chip select CS, shift clock signal SCLK, master in slave out (MOSI) and Master Out Slave In (MISO) signals. The host node 110 and peripheral node 120 may be coupled to one another in a peer-to-peer, star, and/or daisy-chain topology as shown in the FIG. 1 examples, or in any other communications topology.

As shown in FIG. 2, the host node 110 includes a Baud Rate and Chip Select Generation module 113, which is configured to output chip select (CS) and shift clock signal (SCLK) signals to an analogous Baud Rate and Chip Select Reception module 123 of the peripheral node(s) 120. The CS signal indicates whether a message is being communicated to the peripheral node 120 and/or other peripheral nodes (not shown) of system 100. The shift clock signal SCLK is generated by the host node 110 or a component coupled to the host node 110. For example, the shift clock signal SCLK may be coupled to circuitry including a crystal oscillator or other component(s) configured to generate a stable clock reference.

As shown in FIG. 2, the host node 110 includes a transmitter 114 and a transmit buffer 115. To send a message to peripheral node 120, host node 110 stores bits of the message in transmit buffer 115. Transmitter 114 shifts SDO bits (e.g., MOSI bits) to receiver 126 of peripheral node 120, based on the shift clock signal SCLK. The receiver 126 receives the SDO bits as SDI bits (e.g. MOSI bits) and stores the SDI bits in receive buffer 127. In some examples, the transmitter 114 shifts out SDO bits of a message intended for the peripheral node 120 depicted in FIG. 2. In some examples, the SDO bits may instead be intended for another peripheral node (not shown in FIG. 2). For example, the transmitter 114 may send a message with segments of one or more bits for each peripheral node coupled to the host node 110, as described above with reference to a daisy chain topology. Once the bits of the message are stored in the receive buffer 127 when the message has been completed, peripheral node 120 may execute instruction(s) included in the message or use data included in the message.

The peripheral node 120 includes a transmitter 124 configured to shift out SDO bits (e.g., MISO bits) of a message stored in transmit buffer 125 based on the shift clock signal SCLK. In the example of FIG. 2, the transmitter 124 is configured to shift out the SDO bits (e.g., generated by the peripheral node 120, or received as SDI bits) to the receiver 116 of the host node 110, which shifts in the SDI bits based on the shift clock signal SCLK, and stores them in a receive buffer 117

In some examples, the host node 110 and peripheral node(s) 120 may include respective transmit buffer 115 and a receive buffer 127 with a defined number of K data bits used to shift in MOSI data bits and shift out MISO data bits, as triggered by the shift clock signal SCLK. According to some such examples, with each period of the shift clock signal SCLK, one MISO data bit is shifted in and one MOSI bit is shifted out. In some examples, system 100 configured such that a complete message transfer to a number of M peripheral nodes in a daisy chain is transmitted over a number of K*M shift clock periods. As one such example, for a system 100 with three peripheral nodes 120 with receive buffers 127 with 8 bits, a message may be communicated over (K=8*M=3)=24 shift clock periods.

Figure 3:
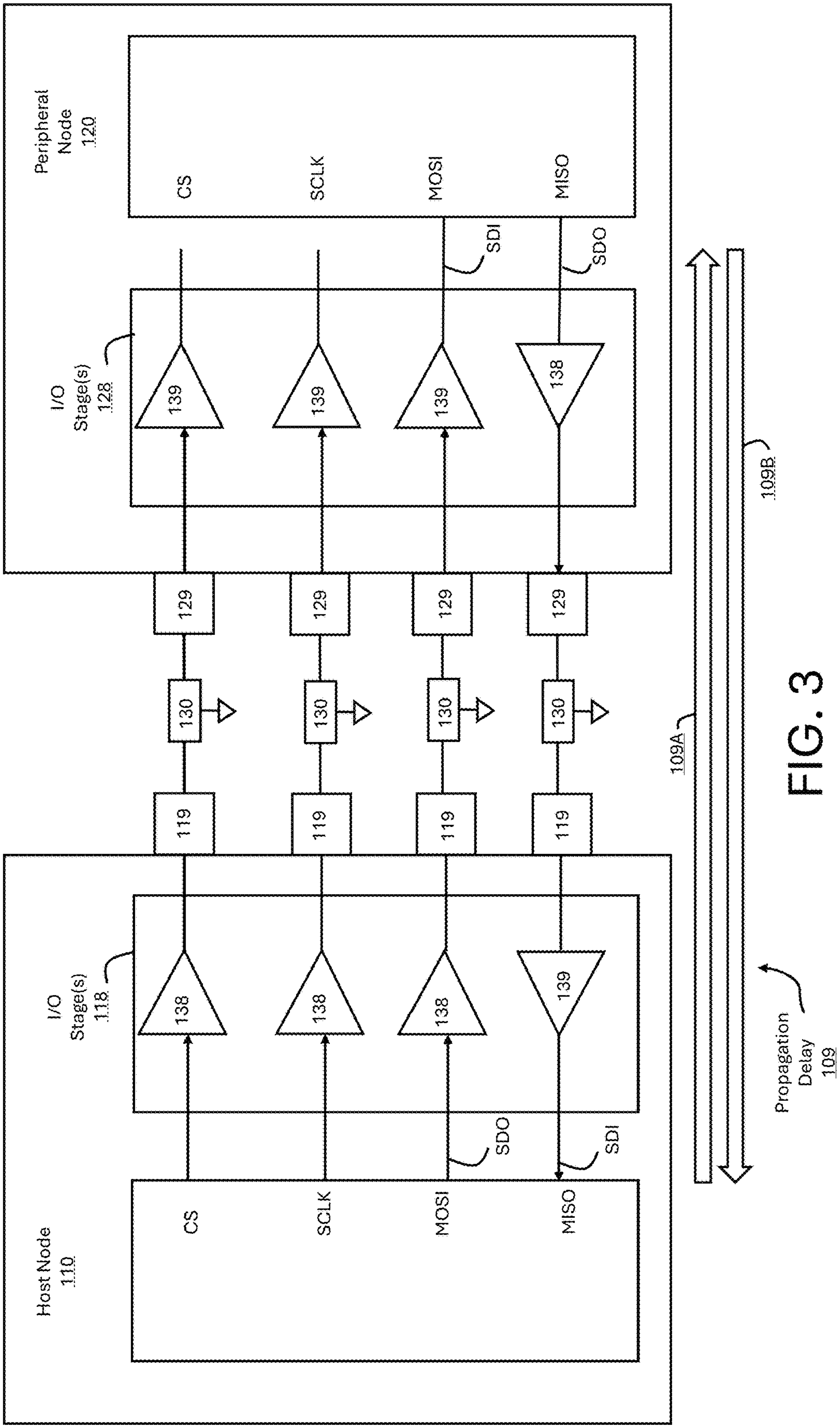
FIG. 3 is a block diagram that depicts a communications system including a host node communicatively coupled with a peripheral node according to some embodiments.

FIG. 3 is a block diagram that depicts a communications system 100 including a host node 110 communicatively coupled with a peripheral node 120 in some embodiments. As shown in FIG. 3, the respective CS, SCLK, MOSI, and MISO signals of the host node 110 are coupled to I/O stages 118 which are configured to condition signals output or received via I/O ports 119. I/O ports 119 are coupled through transmission lines 130 to an I/O port(s) 129, of the peripheral node 120, which are coupled to I/O stage(s) 128 of the peripheral node 120, which are configured to condition signals output or received via the I/O ports 129. The transmission lines 130 may include one or more conductors that couple the I/O ports 119 to the I/O ports 129, for example horizontal traces and/or vertical vias on or in a printed circuit board (PCB), terminal couplings, wiring harness cables, connectors, or other elements such as level shifters, transceivers, isolating couplers, such as inductive, capacitive or optical couplers, clocked storage elements, filters, I/O ports of other devices or the like that coupled the I/O ports 119 to the I/O ports 129.

In some examples, signals communicated between the host node 110 and the peripheral node 120 may not be received at the same time as they are sent. For example, one or more of I/O stages 118, 128, and/or parasitic inductance or capacitance of a transmission lines 130 coupling the host node 110 to the peripheral node 120 may impart a propagation delay 109 on signals communicated between the host node 110 and the peripheral node 120. As shown in FIG. 3, a propagation delay 109A may be imposed on signals from the host node 110 to the peripheral node(s) 120, and a propagation delay 109B may be imposed on signals from the peripheral node(s) 120 to the host node 110. As shown in FIG. 3, a "round trip" propagation delay 109 includes both delays 109A and 109B.

According to a non-limiting example, a host node 110 may trigger shifting out an SDO bit (a MOSI bit) with a first shift clock edge of SCLK. Referring to the FIG. 3 example, the signal SCLK may pass through an output buffer 138 of I/O output stage 118, I/O port 119, transmission lines 130, I/O port 129, and an input buffer 139 of I/O stage 128, before arriving as the SCLK signal at the peripheral node 120. After receiving the shift clock edge (previously generated by the host node 110), the peripheral node 120 shifts out an SDO bit (a MISO bit). The SDO bit passes through an output buffer 138 of I/O stage 128, I/O port 129, transmission line 130, I/O port 119 and an input buffer 139 of input stage 118 before arriving as an SDI bit (a MISO bit) of the host node 120. In some examples, the respective propagation delays 109A, 109B depicted in FIG. 1 impact the respective signals similarly, imparting a delay of similar duration. In other examples, the respective propagation delays 109A, 109B may be different, i.e., with different durations.

In some examples, the collective propagation delay 109 imparted on signals communicated between the host node 110 and respective peripheral node(s) 120 of system 100 may be substantially similar to one another, i.e., with a substantially similar delay imposed on signals to and from each respective node. In other examples, signals communicated by different nodes of a communication system 100 be impacted by different propagation delays 109. For example, a greater propagation delay 109 may be imposed on signals that must traverse longer transmission lines 130 than those that traverse shorter transmission lines 130. In some examples, input and output capacitances may differ between devices used in system 100. In some examples, a peripheral node 120 may be built using different technology than a host node 110, which may cause propagation delays 109 imparted by the respective I/O stage(s) 118, 128 to differ. In still other examples, a number of parallel inputs/outputs (e.g. where host node 110 is coupled through multiple SDI/SDO signals in parallel) that couple the respective components of system 100 with one another may also contribute to propagation delay(s) 109 imposed on signals. In some examples, nodes 120A-120C of a daisy-chain topology may be impacted by different propagation delays 109 dependent on a position in the daisy-chain (i.e., a number of nodes between a transmitting node and the recipient node of a signal).

According to traditional communications system, such as those which incorporate a serial peripheral interface (SPI) communication protocol, nodes of the communication system communicate messages by alternately shifting in SDI bits and shifting out SDO bits triggered by transitions, i.e., edges, in the shift clock SCLK such that the shifting in the SDI bit is separated from the shifting out of the SDO bit by a time difference that is substantially equal to a difference between the respective edges of the shift clock signal SCLK. In a traditional SPI communications system, the host node and peripheral nodes shift in SDI bits and shift out SDO bits responsive to the same respective edges of the shift clock signal, with the host node operating based on the SCLK signal when it is generated, and the peripheral node(s) operating based on when the SCLK signal is received from the host node. For example, the host node triggers shifting out an SDO bit responsive to a first edge of the shift clock signal SCLK generated by the host controller, and the peripheral node similarly triggers shifting out of an SDO bit responsive to the same first shift clock edge when it is received from the host node after being impacted by propagation delay 109A. The host node likewise triggers shifting in an SDI bit (i.e., the SDO bit shifted out by the peripheral node responsive to the first shift clock edge) responsive to a second edge of the shift clock signal SCLK generated by the host controller. The peripheral node similarly triggers shifting in of an SDI bit responsive to the same second shift clock edge of the shift clock signal SCLK, when the second shift clock edge is received from the host node.

A propagation delay 109 on signals communicated between nodes may limit a speed at which traditional serial communications system may be operated. For example, if the propagation delay 109 has a duration close to or exceeding a time difference between the respective shift clock edges of the shift clock signal SCLK, then a traditional host node may trigger shifting in an SDI bit (MISO bit) when the SDI bit has not yet changed or is still unstable (i.e., before the host node has received the current SDI bit shifted out as an SDO bit by the peripheral node). In some examples, this may result in inaccurate data being communicated. As such, traditional serial communications systems may be designed to operate at frequencies low enough to accommodate the propagation delay 109 (i.e., such that the time difference between shift clock edges is longer than the propagation delay 109).

As a non-limiting example, a traditional serial data communications system may incorporate a host node and/or peripheral nodes as devices with an input delay on received signals of about 5 nanoseconds (ns), and an output delay of between 10 ns and 30 ns, depending on characteristics of the input buffer(s), the output buffer(s) and a load driven. According to this example, a propagation delay 109 on signals between the host node and the peripheral node may range from 25 ns to 40 ns. Accordingly, such a traditional serial communication system may be designed to operate with a shift clock SCLK period of greater than 100 nanoseconds, which may correspond to an overall bit rate limit of about 10 Mega Hertz (MHz).

System 100 depicted in FIG. 1 is uniquely configured to enable serial data communications at fast speeds by minimizing an impact of propagation delays 109 on system 100. According to various examples described, host node 110, one or more peripheral nodes 120, or both are configured to alternate between shifting in SDI bits and shifting out SDO bits based on respective first and second edges of the shift clock signal SCLK that are separated from one another by a first time difference, and trigger the shifting in the of SDI bits separated from triggering the shifting out of the SDO bits by a second time difference that is longer than the first time difference. In some examples, the second time difference has a duration selected to be long enough to accommodate a propagation delay 109 (sum of 109A and 109B) imposed as 109A on the shift clock signal SCLK and 109B on the SDO bits. For example, the second time difference may be selected to account for the propagation delay 109 such that SDI bits may be reliably shifted in (i.e., sampled) at faster speeds (i.e., higher frequencies) of the shift clock signal SCLK. Accordingly, system 100 may be utilized to support communications for applications that operate at relatively fast speeds, for example at shift clock frequencies about 10 MHz. In some examples, system 100 may be operated at speeds ranging from 10 to about 20 MHz. In other examples, system 100 may be operated at speeds ranging from 10 to about 40 MHz.

Figure 5A:
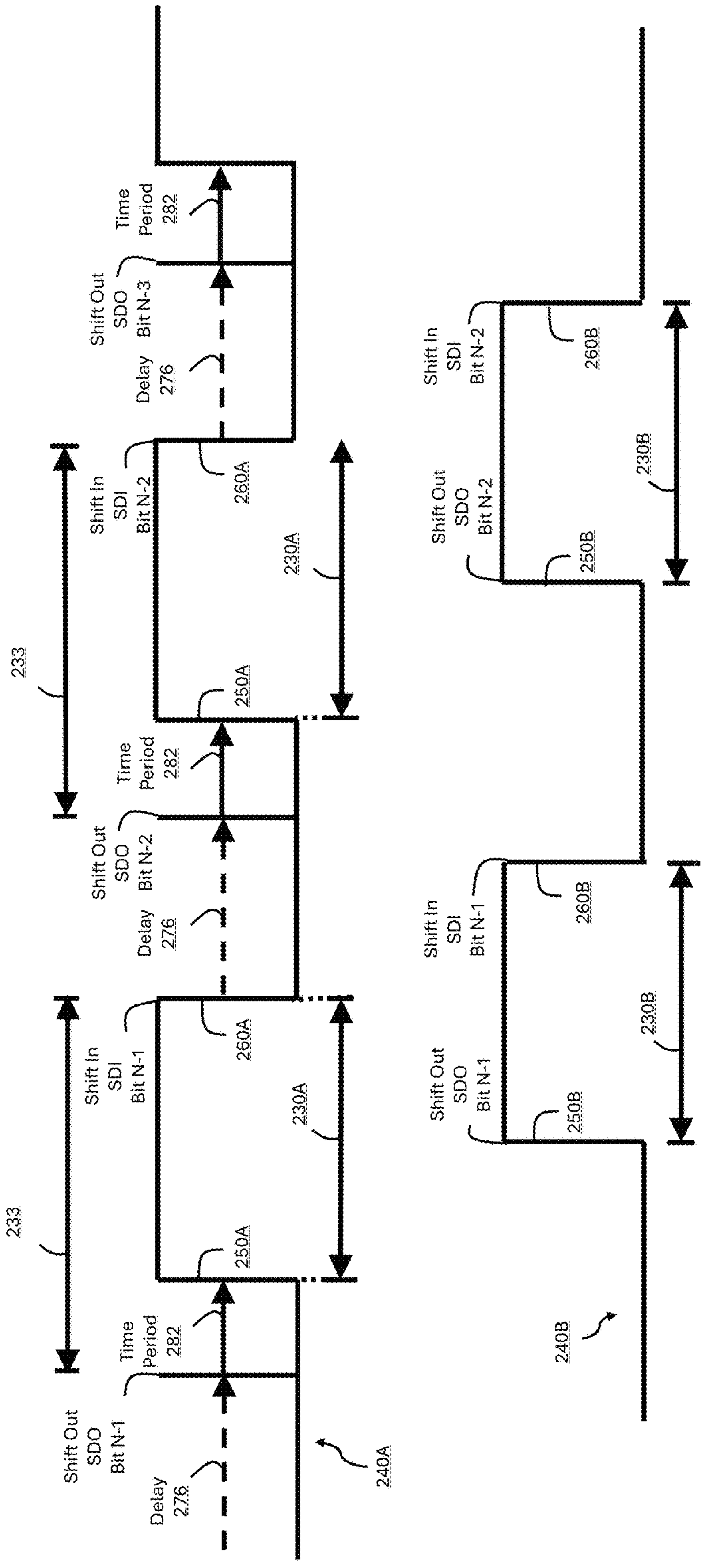
FIG. 5A is a timing diagram showing operations of a host node configured to trigger shifting in SDI bits a second time difference before triggering the shifting out SDO bits according to some embodiments.
Figure 5B:
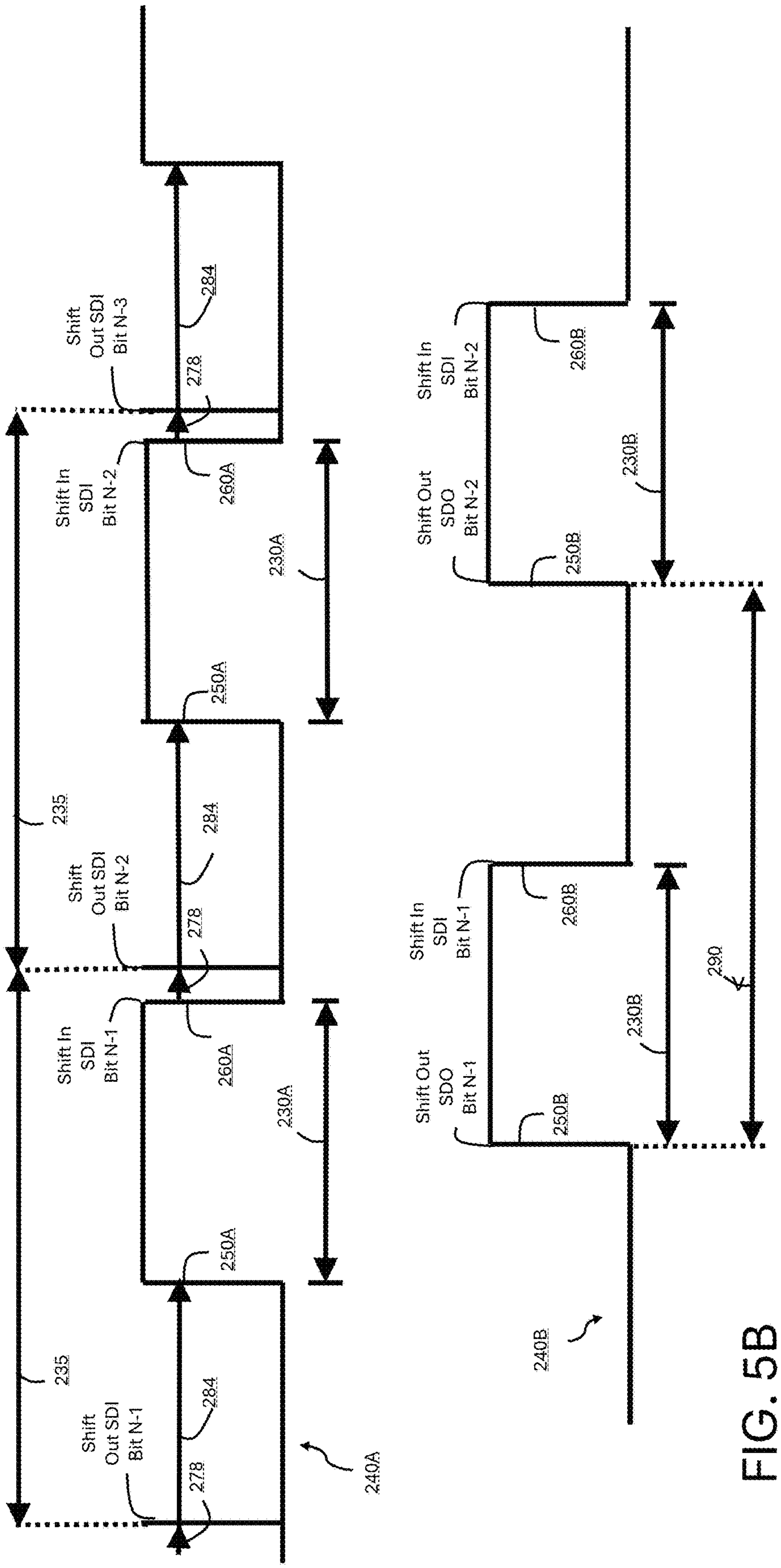
FIG. 5B is a timing diagram that depicts operations of a host node configured to trigger shifting in SDI bits separated from triggering the shifting out of SDO bits by a second time difference that is twice or nearly twice a first time difference according to some embodiments.
Figure 6A:
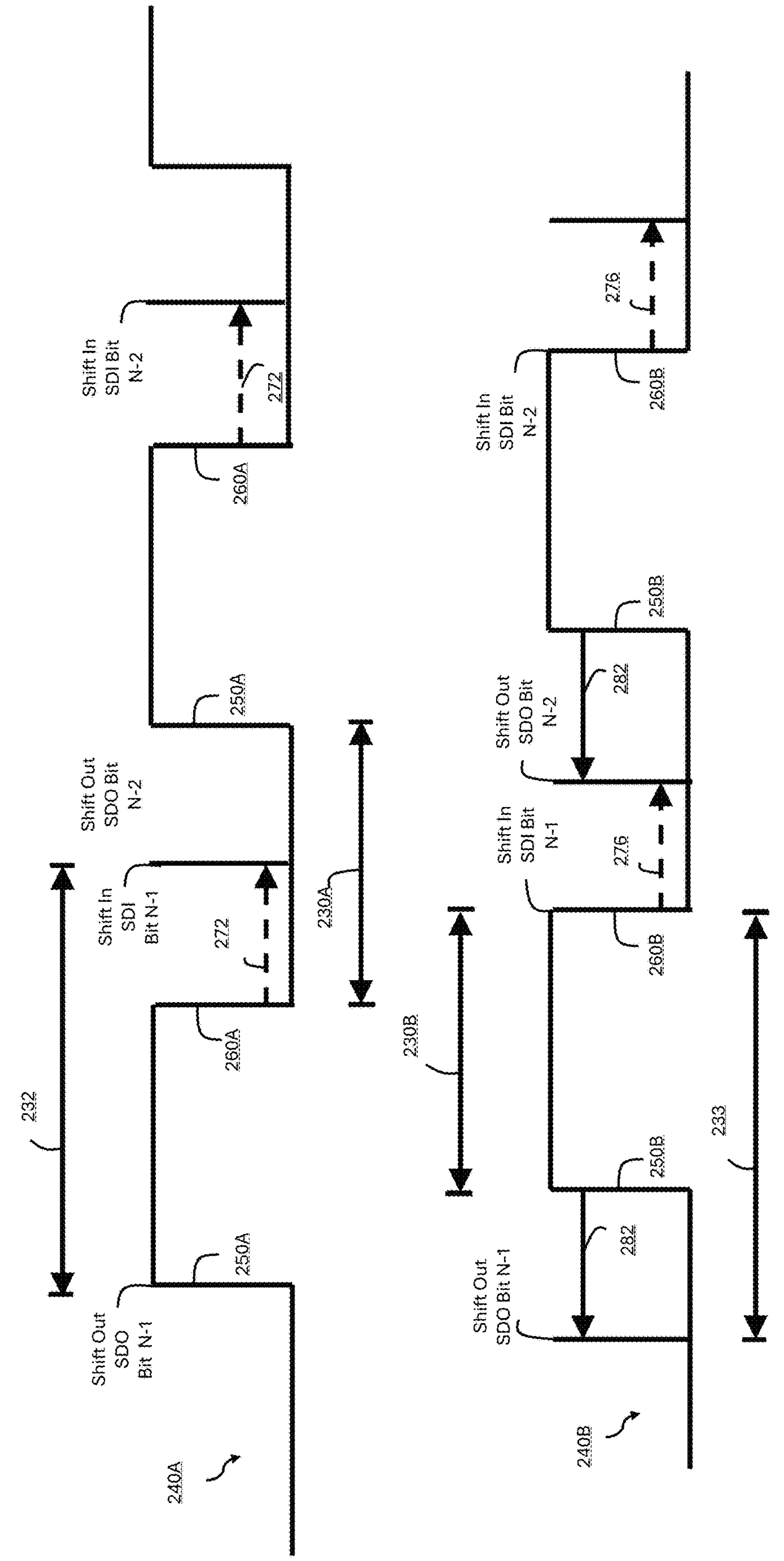
FIG. 6A is a timing diagram showing operations of a host node configured to trigger shifting in SDI bits a second time difference after triggering the shifting out SDO bits and a peripheral node configured to trigger shifting in SDI bits a second time difference before triggering the shifting out SDO bits according to some embodiments.
Figure 6B:
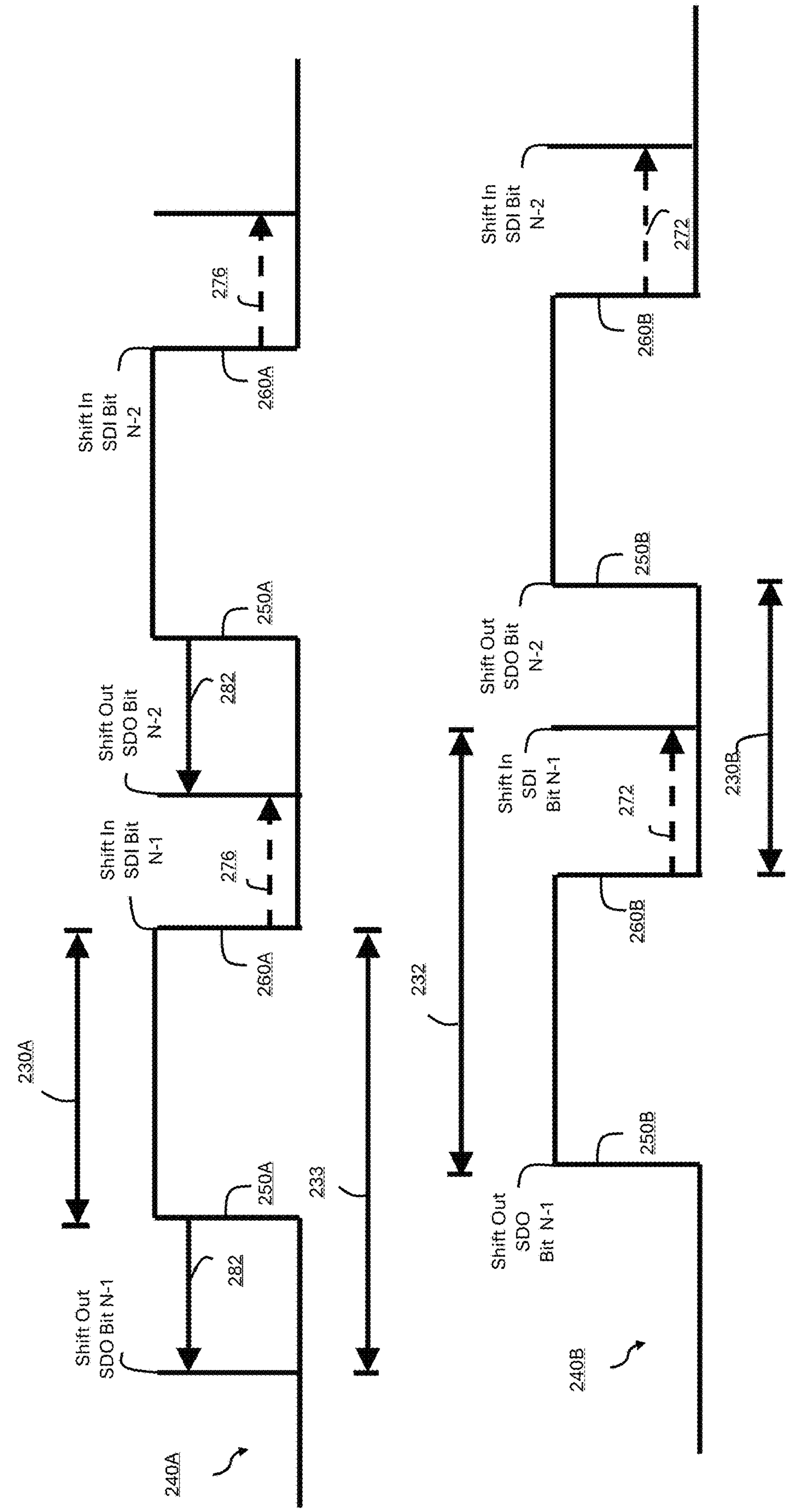
FIG. 6B is a timing diagram showing operations of a peripheral node configured to trigger shifting in SDI bits a second time difference after triggering the shifting out SDO bits and a host node configured to trigger shifting in SDI bits a second time difference before triggering the shifting out SDO bits according to some embodiments.
Figure 7A:
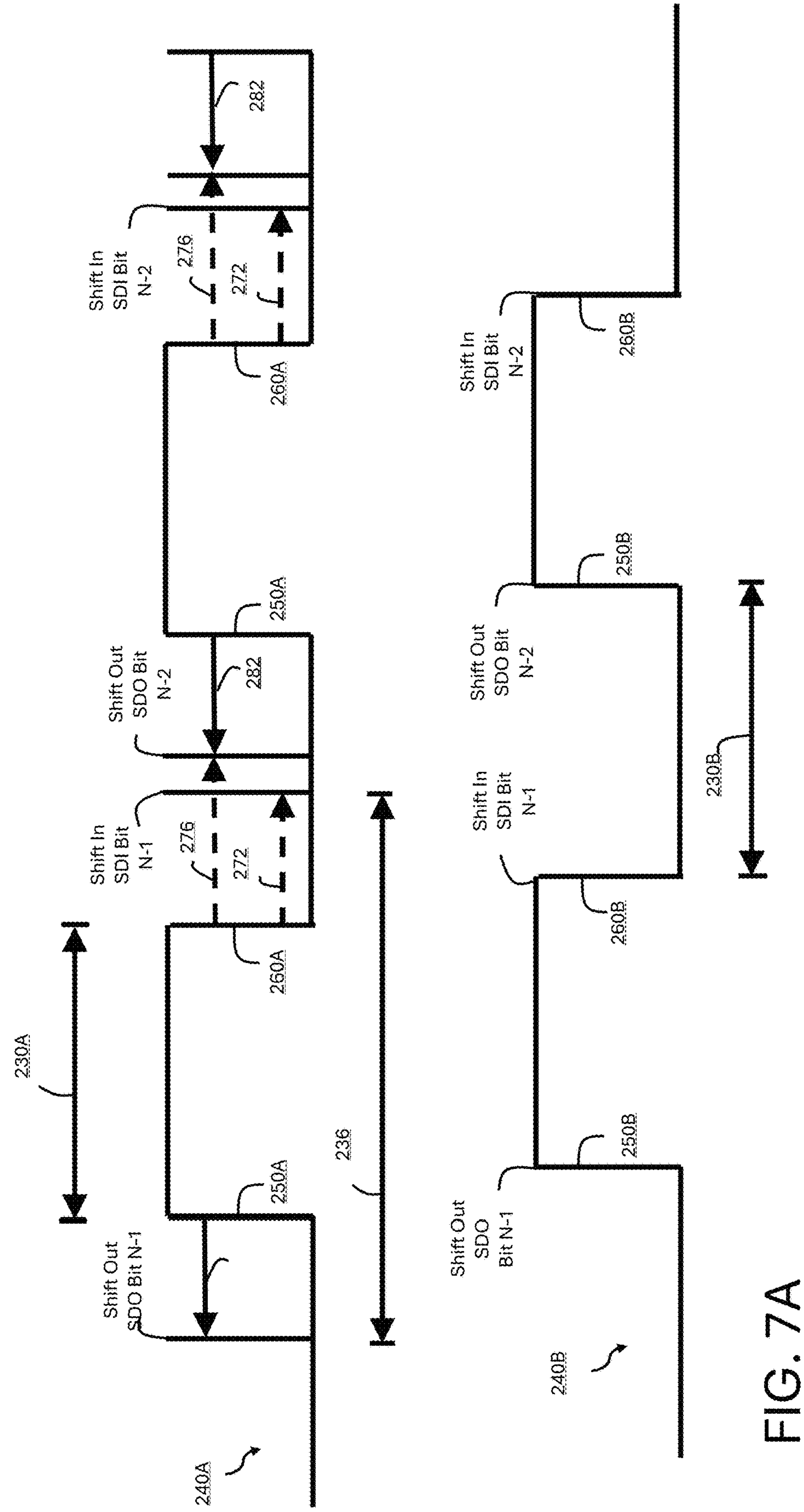
FIG. 7A is a timing diagram showing operations of a host node configured to trigger shifting in SDI bits a second time difference after triggering the shifting out SDO bits, and to trigger shifting in SDI bits a second time difference before triggering the shifting out SDO bits according to some embodiments.
Figure 7B:
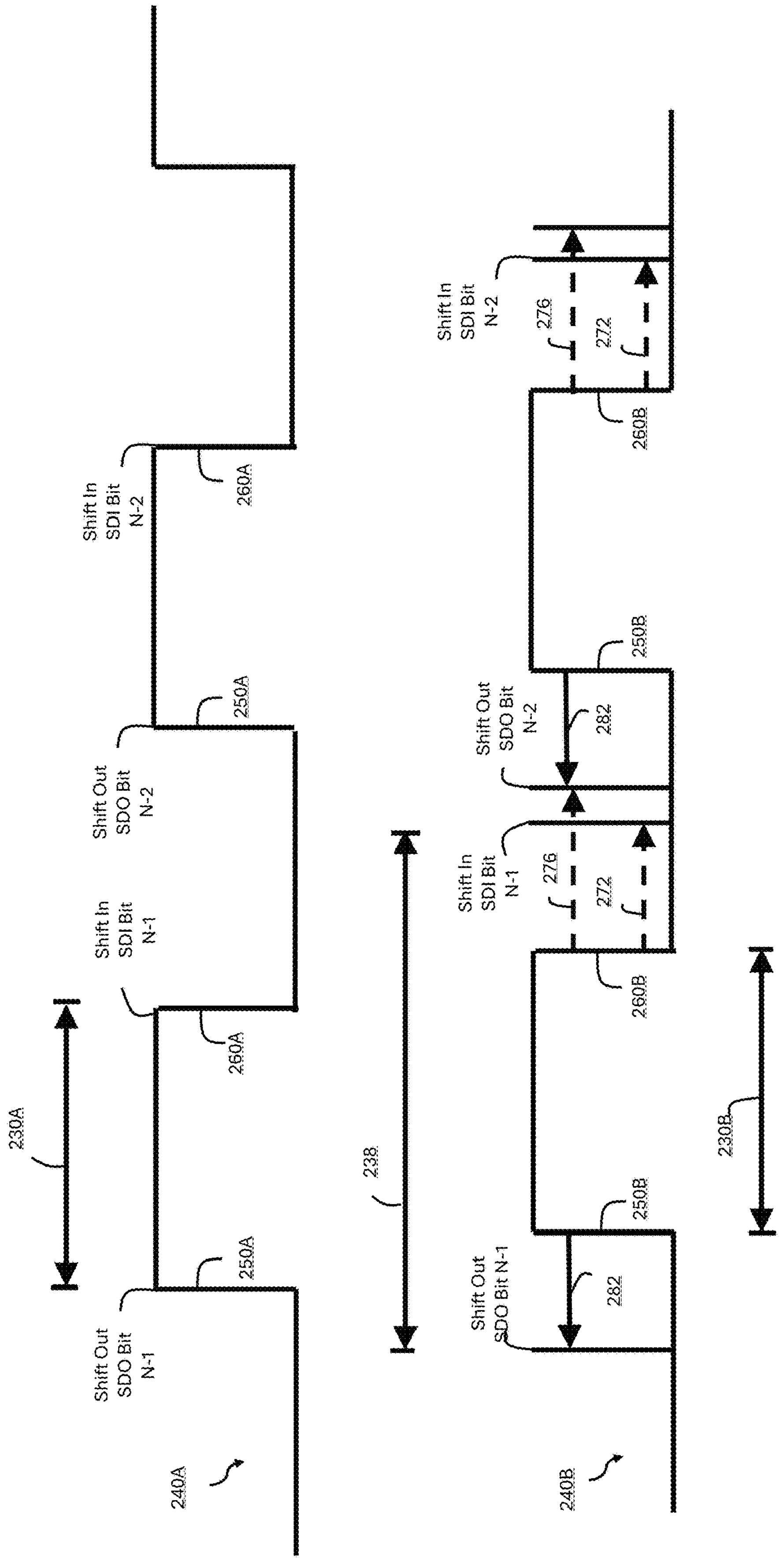
FIG. 7B is a timing diagram showing operations of a peripheral node configured to trigger shifting in SDI bits a second time difference after triggering the shifting out SDO bits and to trigger shifting in SDI bits a second time difference before triggering the shifting out SDO bits according to some embodiments.
Figure 7C:
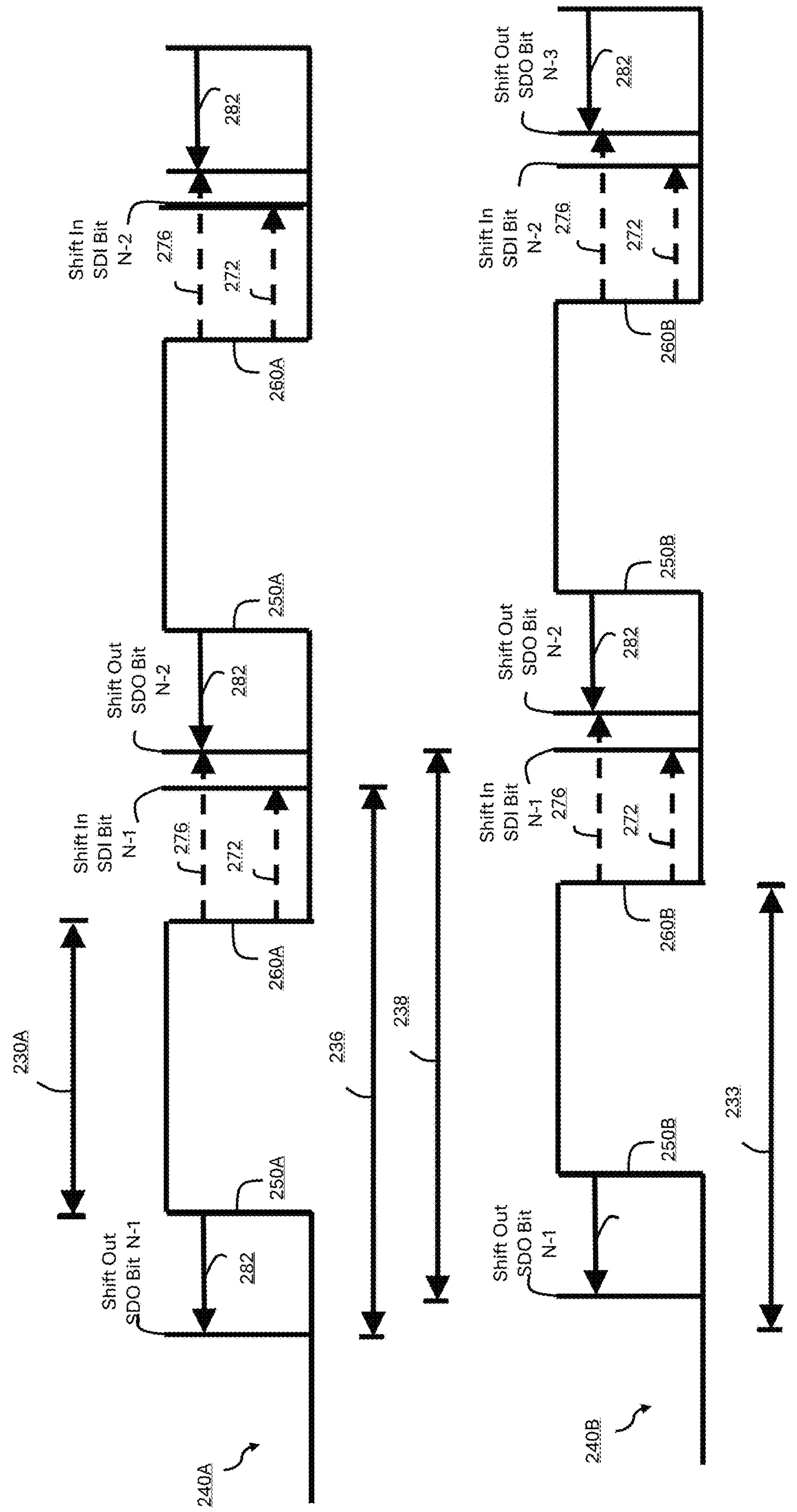
FIG. 7C is a timing diagram showing operations of a peripheral node and a host node both configured to trigger shifting in SDI bits a second time difference after triggering the shifting out SDO bits and to trigger shifting in SDI bits a second time difference before triggering the shifting out SDO bits according to some embodiments.

In some examples, system 100 includes a peripheral node 120 configured to trigger the shifting in of SDI bits separated from triggering the shifting out the SDO bits by a second time difference that is longer than the first time difference as depicted in the examples of FIGS. 4A-4D and discussed in further detail below. The first time difference corresponds to a time between a first SCLK edge and the following SCLK edge (as generated by the host node 110 or as received by the peripheral node 120). In other examples, a host node 110 is configured to communicate by triggering the shifting in of SDI bits separated from shifting out the SDO bits by a second time difference that is longer than the first time difference as depicted in the examples of FIGS. 5A and 5B and discussed in further detail below. In still other examples, the host node 110 is configured to trigger the shifting in the of SDI bits separated from shifting out the SDO bits by a second time difference that is longer than the first time difference, and one or more peripheral nodes 120 are also configured to trigger the shifting in the of SDI bits separated from shifting out the SDO bits by a second time difference that is also longer than the first time difference as depicted in the examples of FIGS. 6A and 6B and discussed in further detail below. In still other examples, the host node 110 and the peripheral node 120 are both configured to trigger the shifting in the of SDI bits separated from shifting out the SDO bits by a second time difference that is longer than the first time difference as depicted in the examples of FIGS. 6A and 6B and discussed in further detail below. In still other examples a host node 110, a peripheral node 120, or both are configured to adjust both triggering the shifting in of SDI bits and triggering the shifting out of SDO bits such that the second time difference is longer than the first time difference as shown in FIGS. 7A-7C and discussed in further detail below.

Figure 4A:
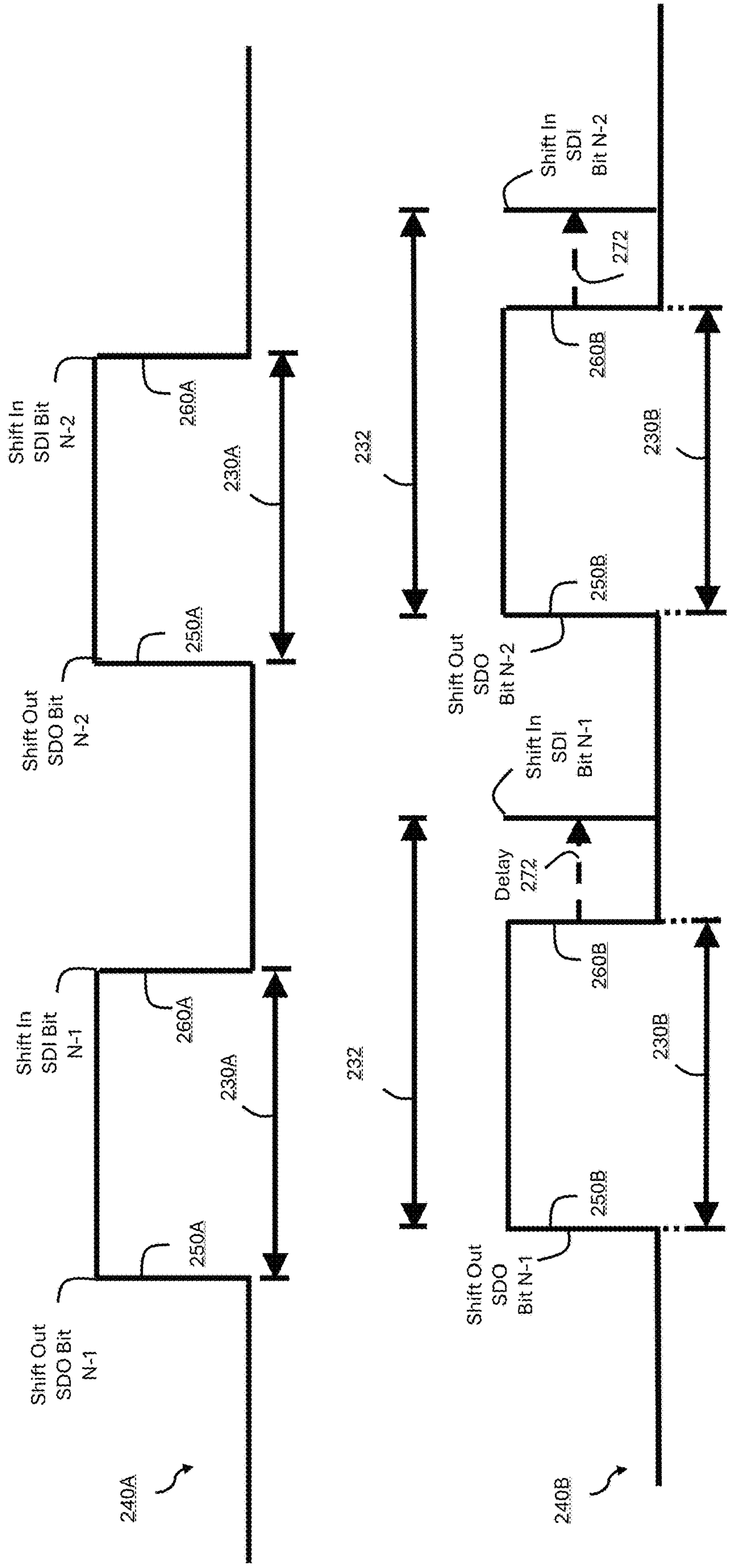
FIG. 4A is a timing diagram showing operations of a peripheral node configured to trigger shifting in SDI bits a second time difference after triggering the shifting out SDO bits according to some embodiments.

FIG. 4A is a timing diagram showing operations of a peripheral node 120 configured to trigger shifting in SDI bits separated from triggering the shifting out of SDO bits by a second time difference according to some embodiments.

The FIG. 4A example shows operations of a host node 110 relative to a shift clock signal SCLK 240A generated by the host node 110, and operations of a peripheral node 120 relative to a shift clock signal SCLK 240B received by a peripheral node 120. Although not shown in FIG. 4A, the peripheral node 120 receives the shift clock signal SCLK 240B after being impacted by a propagation delay 109A as shown in FIG. 3 that causes the shift clock signal SCLK 240B to be received after it was sent as shift clock signal SCLK 240A. Although not shown in FIG. 4A, the host node 110 may receive an SDI bit (an SDO bit from the peripheral node 120) after being impacted by a propagation delay 109B, as also shown in the FIG. 3 example.

As shown in FIG. 4A, the shift clock signal SCLK 240A, 240B includes a plurality of successive shift clock edges including first shift clock edges 250A, 250B, that are separated from second shift clock edges 260A, 260B by a first time difference 230. As shown in FIG. 4A, shift clock signal SCLK 240A is generated by the host node 110 with first shift clock edges 250A separated from the second shift clock edges 260A by a first time difference 230A of the shift clock signal SCLK 240A. As also shown in FIG. 4A, shift clock signal SCLK 240B is received by the peripheral node(s) 120 with first shift clock edges 250B separated from the second shift clock edges 260B by a first time difference 230B of the shift clock signal SCLK 240B. In some examples, where the propagation delay 109A impacts the respective first 250B and second edges 260B edges differently, the first time difference 230A of the generated shift clock signal SCLK 240A may differ from the first time difference 230B of the received shift clock signal SCLK 240B. In other examples, the first time difference 230A may be substantially similar to the first time difference 230B.

In the example of FIG. 4A, the first shift clock edges 250A, 250B are of a first type (a rising edge), and the second shift clock edge edges 260A, 260B of a second type different than the first type (a falling edge), successively with the second shift clock edges 260A, 260B immediately following the first shift clock edges 250A, 250B, and the first shift clock edges 250A, 250B immediately following the second shift clock edges 260A, 260B. In other examples not depicted, the first shift clock edges 250A, 250B may be falling edges, and the second shift clock edges 260A, 260B may be rising edges. In still other examples, the shift clock signal SCLK 240A, 240B may be defined differently, for example where the first shift clock edges 250A, 250B and the second shift clock edges 260A, 260B are both of the same type (successive rising edges or successive falling edges) and/or separated from one another by other edges, by the first time difference 230A, 230B.

According to the example of FIG. 4A, both the host node 110 and the peripheral node 120 are configured to alternate between shifting out SDO bits and shifting in SDI bits based on the respective shift clock edges 250A, 250B and 260A, 260B. As shown by received shift clock signal SCLK 240A, the host node 110 is configured to operate according to traditional serial communications responsive to the shift clock signal SCLK 240A generated by the host node 110, to shift out SDO bits responsive to the first shift clock edges 250A, and shift in SDI bits responsive to the second shift clock edges 260A such that triggering the shifting out of the SDO bits is separated from triggering the shifting in the SDI bits by the first time difference 230A.

The FIG. 4A example shows an N−1 and an N−2 bit being communicated between the host node 110 and the peripheral node 120. In some examples, one or more bits (i.e., an Nth, or first bit) may have been previously been communicated, either as shown or in response to a CS signal changing state.

As shown in FIG. 4A, the host node 110 shifts out an SDO bit N−1 responsive to, (i.e., upon receipt of and/or at substantially the same time as), the first shift clock edge 250A of the generated shift clock signal SCLK 240A, and shifts in an SDI bit N−1 responsive to a second shift clock edge 260A. The host node 110 also shifts out an SDO bit N−2 responsive to a subsequent first shift clock edge 250A, and shifts in an SDI bit N−2 responsive to a subsequent second shift clock edge 260A. As shown in the example of FIG. 4A, the host node 110 triggers the shifting out of SDO bits separated by the first time difference 230A from when the host node 110 triggers the shifting in of the SDI bits.

According to the example of FIG. 4A, the peripheral node 120 is configured to operate differently than the host node 110 such that the peripheral node 120 triggers shifting in an SDI bit separated from when the peripheral node 120 triggers shifting out an SDO bit by a second time difference 232 that is longer than the first time difference 230B. Referring to the received shift clock signal SCLK 240B depicted in FIG. 4A, the peripheral node 120 does not shift in the SDI bits in direct response to the second shift clock edge 260B. Instead, the peripheral node 120 shifts in the SDI bits separated from triggering the shifting out of the SDO bits (and separated from the first shift clock edge 250B) by the second time difference 232, which is longer than the first time difference 230B.

According to the FIG. 4A example, the peripheral node 120 triggers shifting in the SDI bits at a time after the second shift clock edge 260B. For example, as shown in FIG. 4A, the peripheral node 120 triggers the shifting in of the SDI bits after applying a known delay 272 responsive to the second shift clock edges 260B. In some examples, the peripheral node 120 is configured to apply the known delay 272 with a duration selected to accommodate a propagation delay 109A imposed on signals transmitted from the host node 110 to the peripheral node 120 and/or 109B imposed on signals transmitted from the peripheral node 120 to the host node 110 as shown in FIG. 3. For example, the known delay 272 may be selected such that if a frequency of the shift clock signal SCLK 240A, 240B is increased (i.e., the first time difference 230A, 230B is reduced) relative to the FIG. 4A diagram, SDI bits are shifted in by the peripheral node 120 when the SDI bits are stable.

As shown in FIG. 4A, the peripheral node 120 shifts out an SDO bit N−1 responsive to the first shift clock edge 250A. Responsive to the second shift clock edge 260A, the peripheral node 120 applies the known delay 272, and shifts in the SDI bit N−1 after applying the known delay 272. The peripheral node 120 then shifts out a next SDO bit N−2 responsive to the first shift clock edge 250A, and triggers shifting in an SDI bit N−2 after applying the known delay 272, such the SDI bit N−2 is shifted in separated from shifting out the SDO bit 1 by the second time difference 232.

Figure 4B:
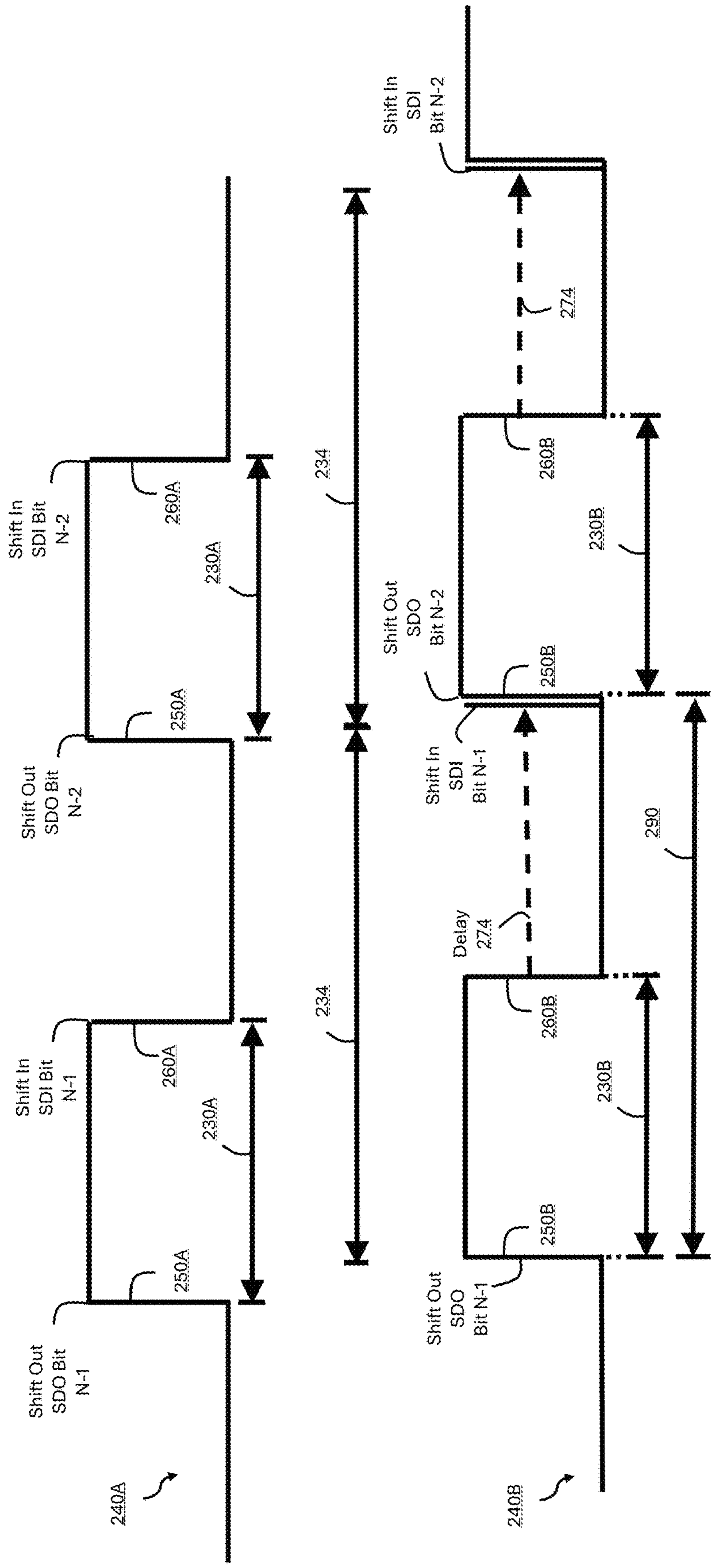
FIG. 4B is a timing diagram that depicts operations of a peripheral node configured to trigger shifting in SDI bits separated from triggering the shifting out of SDO bits by a second time difference that is twice or nearly twice a first time difference according to some embodiments.

FIG. 4B is a timing diagram that depicts operations of a peripheral node 120 configured to trigger shifting in SDI bits separated from triggering the shifting out of SDO bits by a second time difference 234 with a duration substantially equal to, or slightly less than, a full period 290 of the shift clock signal SCLK 240A, 240B, i.e., a difference between two edges of the same type (e.g., successive edges 250A, successive edges 260A) according to some embodiments. Like the FIG. 4A example, FIG. 4B shows operations of a host node 110 relative to a shift clock signal SCLK 240A generated by the host node 110, and operations of a peripheral node 120 relative to a shift clock signal SCLK 240B received by a peripheral node 120.

In the example of FIG. 4B, the host node 110 operates according to traditional serial communications protocols and alternates between shifting in SDI bits and shifting out SDO bits responsive to the first and second shift clock edges 250A, 260A such that triggering the shifting in an SDI bit is separated from triggering the shifting out an SDO bit by the first time difference 230A. The example of FIG. 4B differs from the example of FIG. 4A in that the peripheral node 120 triggers the shifting in of the SDI bits separated from triggering the shifting out of the SDO bits (and separated from the first shift clock edge 250B) by a second time difference 234 which is longer than the second time difference 232 depicted in FIG. 4A.

Specifically, in the FIG. 4B example, the second time difference 234 is selected to be substantially equal to, or nearly as long as, a full period 290 of the shift clock signal SCLK 240A (e.g., substantially twice or nearly twice the first time difference 230A). According to these examples, the peripheral node 120 applies a known delay 274 with a duration substantially equal to the first time difference 230B after the second shift clock edges 260A. As also shown in FIG. 4B, with the second time difference 234 substantially equal or nearly equal to a full period 290 of the shift clock signal SCLK 240A, the peripheral node 120 may trigger shifting in a current SDI bit (e.g., SDI bit N−1) at the substantially same time as or immediately after triggering shifting out a next SDO bit (e.g., SDI bit N−2) (i.e., aligned with the first shift clock edges 250A). In this manner, by applying the known delay 274, the peripheral node 120 extends the shifting in of an SDI data bit to a next first shift clock edge 250A, which may represent a maximum delay that can be applied.

Figure 4C:
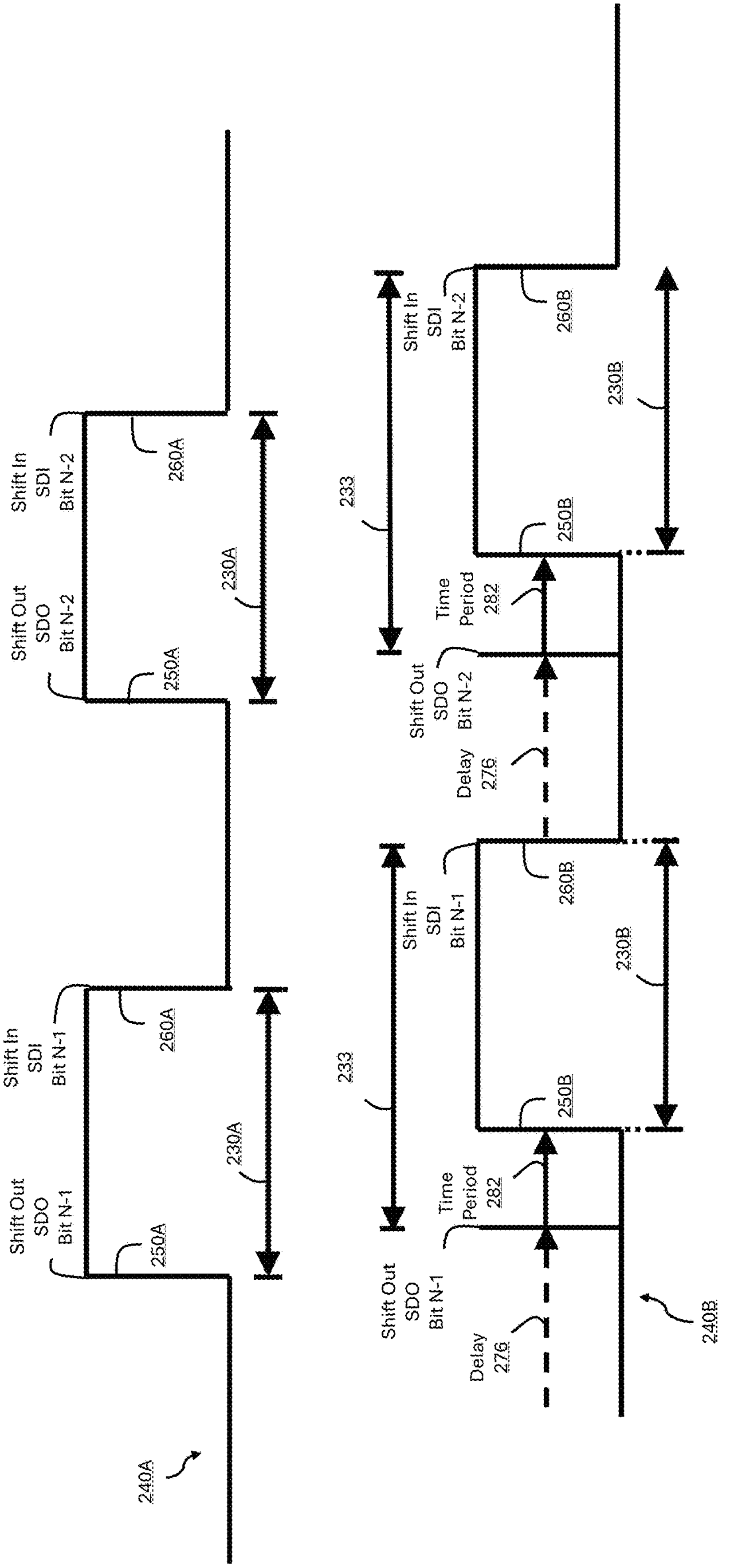
FIG. 4C is a timing diagram showing operations of a peripheral node configured to trigger shifting in SDI bits a second time difference before triggering the shifting out SDO bits according to some embodiments.

FIG. 4C is a timing diagram showing operations of a peripheral node 120 configured to trigger shifting in SDI bits separated from triggering the shifting out of SDO bits by a second time difference 233 according to some embodiments. Like the example of FIG. 4A, FIG. 4C shows operations of a host node 110 relative to a shift clock signal SCLK 240A generated by the host node 110, and operations of a peripheral node 120 relative to a shift clock signal SCLK 240B received by a peripheral node 120.

As shown by the generated shift clock signal SCLK 240A, in the example of FIG. 4C, the host node 110 is configured to operate according to traditional serial communications as described above with respect to FIG. 4A. According to the example of FIG. 4C, the peripheral node 120 is configured to operate differently than the host node 110 such that the peripheral node 120 shifts in SDI bits separated from shifting out SDO bits by a second time difference 233 that is longer than the first time difference 230. Referring to the received shift clock signal SCLK 240B depicted in FIG. 4C, the peripheral node 120 does not trigger shifting out SDO bits directly responsive to the first shift clock edge 250B. Instead, the peripheral node 120 triggers shifting out the SDO bits separated from shifting in the SDI bits (and the first shift clock edge 250B) by the second time difference 233, which is longer than the first time difference 230. The peripheral node 120 may trigger shifting out the SDO bits a predetermined time 282 before the first shift clock edges 250B, for example after applying a known delay 276 responsive to the second shift clock edges 260B, or another signal edge (e.g., an edge of a CS signal) before triggering the shifting out of the SDO bits. In some examples, the peripheral node 120 is configured to apply the known delay 276 to accommodate a propagation delay 109A, 109B imposed on signals transmitted between the peripheral node 120 and the host node 110. For example, the known delay 276 may be selected such that if a frequency of the shift clock signal SCLK 240A, 240B is increased (i.e., the first time difference 230A, 230B is reduced), SDI bits are shifted in at a time when the SDI bits are stable.

As shown in FIG. 4C, the peripheral node 120 shifts out an SDO bit N−1 a predetermined time 282 before the shift clock edge 250B. Responsive to a shift clock edge 260B, the peripheral node 120 shifts in the SDI bit N−1. Responsive to the shift clock edge 260B, the peripheral node 120 applies the known delay 276, and shifts out the SDO bit N−2 after applying the known delay 276. The peripheral node 120 then shifts in an SDI bit N−2 responsive to the shift clock edge 260B, and shifts out an SDO bit N−2, after applying the known delay 276.

Figure 4D:
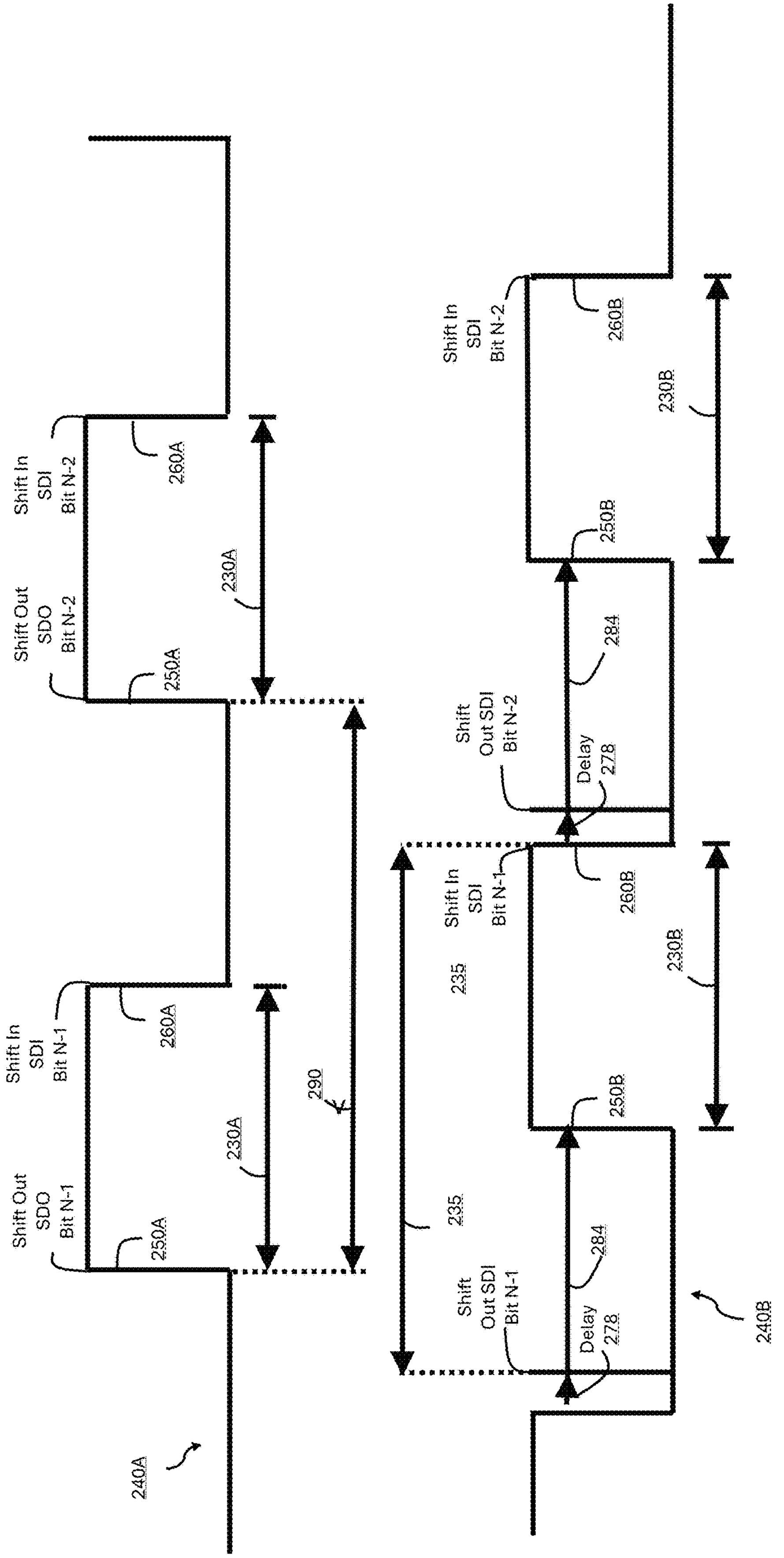
FIG. 4D is a timing diagram that depicts operations of a peripheral node configured to trigger shifting in SDI bits separated from triggering the shifting out of SDO bits by a second time difference that is twice or nearly twice a first time difference according to some embodiments.

FIG. 4D is a timing diagram that depicts operations of a peripheral node 120 configured to trigger shifting in SDI bits separated from triggering the shifting out of SDO bits by a second time difference 235 that is substantially equal to, or close to as long as, a full period 290 of the shift clock signal SCLK 240A, 240B according to some embodiments. Like the FIG. 4A-4C examples, FIG. 4D shows operations of a host node 110 relative to a shift clock signal SCLK 240A generated by the host node 110, and operations of a peripheral node 120 relative to a shift clock signal SCLK 240B received by a peripheral node 120.

In the example of FIG. 4D, the host node 110 and peripheral node 120 operate similarly to the example shown in FIG. 4C. The example of FIG. 4D differs from the example of FIG. 4C in the peripheral node 120 triggers the shifting out the SDO bit separated from shifting in the SDI bit by a second time difference 235 that is longer than the second time difference 233 depicted in FIG. 4C. According to the FIG. 4D example, the second time difference 235 is substantially equal to, or nearly as long as, a full period 290 of the shift clock signal SCLK 240B. According to these examples, the peripheral node 120 triggers shifting in the SDI bit a predetermined time 284 before the first shift clock edges 250B, for example by applying a known delay 278 (i.e., a known delay=0 or slightly greater than 0) after the second shift clock edges 260B before triggering shifting out an SDO bit. As also shown in FIG. 4D, with the second time difference 235 substantially equal to, or nearly to as long as, the shift clock period 290, the peripheral node 120 triggers the shifting out of a current SDO bit (e.g., SDI bit 1) at substantially the same time as, or just after, shifting in a previous SDI bit (e.g., SDI bit 0) (i.e., aligned with the second shift clock edge 260B). In this manner, the peripheral node 120 extends the shifting out of an SDO data bit to a previous second shift clock edge 260B, which may represent a minimum known delay 278 that can be applied.

FIG. 5A is a timing diagram showing operations of a host node 110 configured to trigger shifting in SDI bits separated from triggering the shifting out of SDO bits by a second time difference 233 according to some embodiments. Like the example of FIGS. 4A-4D, FIG. 5A shows operations of a host node 110 relative to a shift clock signal SCLK 240A generated by the host node 110, and operations of a peripheral node 120 relative to a shift clock signal SCLK 240B received by a peripheral node 120.

As shown by the received shift clock signal SCLK 240B, in the example of FIG. 5A, the peripheral node 120 is configured to operate according to traditional serial communications, to shift out SDO bits responsive to the first shift clock edges 250B, and shift in SDO bits responsive to the second shift clock edges 260B, such that the peripheral node 120 shifts out SDO bits separated from shifting in the SDI bits by the first time difference 230B. As shown in FIG. 5A, the peripheral node 120 shifts out an SDO bit N1 responsive to, (i.e., upon receipt of and/or at substantially the same time as), the first shift clock edge 250 of the shift clock signal SCLK 240B, and shifts in an SDI bit N−1 responsive to a second shift clock edge 260B. Subsequently, the peripheral node 120 shifts out an SDO bit N−2 responsive to a subsequent first shift clock edge 250A, and shifts in an SDI bit N responsive to a subsequent second shift clock edge 260B.

According to the example of FIG. 5A, the host node 110 is configured to operate differently than the peripheral node 120 such that the host node 110 shifts in SDI bits separated from shifting out SDO bits by a second time difference 233 that is longer than the first time difference 230A. Referring to the generated shift clock signal SCLK 240A depicted in FIG. 5A, the host node 120 does not trigger shifting out SDO bits directly responsive to the first shift clock edge 250A. Instead, the host node 110 triggers shifting out the SDO bits separated from shifting in the SDI bits (and the first shift clock edge 250A) by the second time difference 233, which is longer than the first time difference 230A. The host node 110 may trigger shifting out the SDO bits a predetermined time 282 before the first shift clock edges 250A, for example after applying a known delay 276 responsive to the second shift clock edges 260A before triggering the shifting out of the SDO bits. In some examples, the host node 110 is configured to apply a known delay 276 to accommodate a propagation delays 109A, 109B imposed on signals transmitted between the peripheral node 120 to the host node 110. For example, the known delay 276 may be selected such that if a frequency of the shift clock signal SCLK 240A, 240B is increased (i.e., the first time difference 230A, 230B is reduced), SDI bits are shifted in at a time when the SDI bits are stable.

As shown in FIG. 5A, the host node 110 shifts out an SDO bit N−1 a predetermined time 282 before the shift clock edge 250A. Responsive to a shift clock edge 260A, the host node 110 shifts in the SDI bit N−1. Responsive to the shift clock edge 260A (or another signal edge such as a CS signal edge), the host node 110 applies the known delay 276, and shifts out the SDO bit N−2 after applying the known delay 276. The host node 110 then shifts in an SDI bit N−2 responsive to the shift clock edge 260A, and shifts out an SDO bit N−2, after applying the known delay 276.

FIG. 5B is a timing diagram that depicts operations of a host node 110 configured to trigger shifting in SDI bits separated from triggering the shifting out of SDO bits by a second time difference 235 that is substantially equal to, or close to as long as, a full period 290 of the shift clock signal SCLK 240A, 240B according to some embodiments. Like the FIG. 5A example, FIG. 5B shows operations of a host node 110 relative to a shift clock signal SCLK 240A generated by the host node 110, and operations of a peripheral node 120 relative to a shift clock signal SCLK 240B received by a peripheral node 120.

In the example of FIG. 5B, the host node 110 and peripheral node 120 operate similarly to the example shown in FIG. 5A. The example of FIG. 5B differs from the example of FIG. 5A in the host node 110 triggers the shifting out the SDO bit separated from shifting in the SDI bit by a second time difference 235 that is longer than the second time difference 233 depicted in FIG. 5A. According to the FIG. 5B example, the second time difference 235 is substantially equal to, or close to as long as, a full period 290 of the shift clock signal SCLK 240A. According to these examples, the host node 110 triggers shifting in the SDI bit a predetermined time 284 before the first shift clock edges 250B, for example by applying a known delay 278 (i.e., a known delay=0 or slightly greater than 0) after the first shift clock edges 250B before triggering shifting out an SDO bit. As also shown in FIG. 5B, with the second time difference 235 substantially equal to, or nearly as long as, the shift clock period 290, the host node 110 triggers the shifting out of a current SDO bit (e.g., SDI bit 1) at substantially the same time, or shortly after shifting in a previous SDI bit (e.g., SDI bit 0) (i.e., aligned with the second shift clock edge 260A). In this manner, the host node 110 extends the shifting out of an SDO data bit to a previous second shift clock edge 260B, which may represent a maximum minimum known delay that can be applied.

FIG. 6A is a timing diagram showing a shift clock signal SCLK 240A generated by a host node 110, and a shift clock signal SCLK 240B received by a peripheral node 120 according to some embodiments. Like the examples of FIGS. 4A-4D, and 5A-5B described above, the host node 110 and the peripheral node 120 are configured to shift in SDI bits and shift out SDO bits based on shift clock signals SCLK 240A, 240B that include a plurality of successive first shift clock edges 250A, 250B, and a plurality of second shift clock edges 260A, 260B separated from one another by a first time difference 230A, 230B.

According to the example of FIG. 6A, both the host node 110 and the peripheral node 120 are configured to operate differently than according to a traditional serial communications protocol. As shown in FIG. 6A, the host node 110 triggers shifting in SDI bits separated from when the host node 110 triggers shifting out of SDO bits by a second time difference 232 that is longer than the first time difference 230A, for example by applying a known delay 272 after the second shift clock edge 260A before shifting in the SDI bit, as described above with respect to the example of FIG. 4A. In addition, as also shown in FIG. 6A, the peripheral node 120 triggers shifting in the SDI bits separated from when the peripheral node 120 triggers shifting out the SDO bits by a second time difference 233 that is greater than the first time difference 230B, for example by shifting out the SDO bits a predetermined time 282 before the first shift clock edges 250B, for example by applying a known delay 276 responsive to the second shift clock edges 260B before shifting out the SDO bits.

According to the example of FIG. 6A, both the host node 110 and the peripheral node 120 are operable to trigger the shifting in of SDI bits separated from triggering the shifting out of SDO bits by a second time difference 232, 233, both of which are greater than the respective first time differences 230A, 230B. In some examples, the host node 110 and the peripheral node 120 are configured to apply the respective second time differences 232, 233 to accommodate propagation delays 109A, 109B imposed on signals between the host node 110 and the peripheral node 120, for example where the sum of propagation delays 109A, 109B is larger than the first time difference 230A. For example, the known delays 272, 276 may be selected such that if a frequency of the shift clock signal SCLK 240A, 240B is increased (i.e., the first time differences 230A, 230B are reduced), SDI bits are shifted in at a time when the SDI bits are stable.

FIG. 6B is a timing diagram showing a shift clock signal SCLK 240A generated by a host node 110, and a shift clock signal SCLK 240B received by a peripheral node 120 according to some embodiments. Like the examples of FIGS. 4A-4D, 5A-5B, and 6A described above, the host node 110 and the peripheral node 120 are configured to shift in SDI bits and shift out SDO bits based on shift clock signals SCLK 240A, 240B that include a plurality of successive first shift clock edges 250A, 250B, and a plurality of second shift clock edges 260A, 260B separated from one another by a first time difference 230A, 230B.

According to the example of FIG. 6B, both the host node 110 and the peripheral node 120 are configured to operate differently than according to a traditional serial communications protocol. As shown in FIG. 6B, the peripheral node 120 triggers shifting in SDI bits separated from when the peripheral node 120 triggers shifting out of SDO bits by a second time difference 232 that is longer than the first time difference 230B, for example by applying a known delay 272 after the second shift clock edge 260B before shifting in the SDI bit. In addition, as also shown in FIG. 6B, the host node 110 triggers shifting in the SDI bits separated from when the host node 110 triggers shifting out the SDO bits by a second time difference 233 that is greater than the first time difference 230A, for example by shifting out the SDO bits a predetermined time 282 before the first shift clock edges 250A, such as by applying a known delay 276 responsive to the second shift clock edges 260A before shifting out the SDO bits.

According to the example of FIG. 6B, both the host node 110 and the peripheral node 120 are operable to trigger the shifting in of SDI bits separated from triggering the shifting out of SDO bits by respective second time differences 232, 233, both of which are that is greater than the respective first time differences 230A, 230B.

FIG. 7A is a timing diagram showing a shift clock signal SCLK 240A generated by a host node 110, and a shift clock signal SCLK 240B received by a peripheral node 120 according to some embodiments. Like the examples of FIGS. 4A-4D, 5A-5B, and 6A-6B described above, the host node 110 and the peripheral node 120 are configured to shift in SDI bits and shift out SDO bits based on an shift clock signals SCLK 240A, 240B that include a plurality of successive first shift clock edges 250A, 250B, and a plurality of second shift clock edges 260A, 260B separated from one another by a first time difference 230A, 230B.

As shown by the received shift clock signal SCLK 240B, in the example of FIG. 5A, the peripheral node 120 is configured to operate according to traditional serial communications, to shift out SDO bits responsive to the first shift clock edges 250B, and shift in SDO bits responsive to the second shift clock edges 260B, such that the peripheral node 120 shifts out SDO bits separated from shifting in the SDI bits by the first time difference 230B.

According to the example of FIG. 7A, the host node 110 is configured to operate differently than according to a traditional serial communications protocol. According to the example of FIG. 7A, the host node 110 triggers shifting in SDI bits separated from when the host node 110 triggers shifting out of SDO bits by a second time difference 236 that is longer than the first time difference 230A by changing when the host node 110 shifts out SDO bits relative to the first shift clock edges 250A and when the host node 110 shifts in SDI bits relative to the second shift clock edges 260A. For example, as shown in FIG. 7A, the host node 110 triggers shifting in SDI bits after applying a known delay 272 after the second shift clock edge 260A. In addition, as also shown in FIG. 7A, the host node 110 triggers shifting out SDO bits a predetermined time 282 before the first shift clock edges 250A, for example by applying a known delay 276 after the second shift clock edge 260A (or another signal edge such as a CS signal edge). In some examples, the host node 110 and the peripheral node 120 are configured to apply the respective second time difference 236 to accommodate propagation delays 109 imposed on signals between the host node 110 and the peripheral node 120, for example where the propagation delay 109 is larger than the first time differences 230A, 230B. For example, the known delays 272, 276 may be selected such that if a frequency of the shift clock signal SCLK 240A, 240B is increased (i.e., the first time differences 230A, 230B are reduced), SDI bits are shifted in at a time when the SDI bits are stable.

FIG. 7B is a timing diagram showing a shift clock signal SCLK 240A generated by a host node 110, and a shift clock signal SCLK 240B received by a peripheral node 120 according to some embodiments. Like the examples of FIGS. 4A-4D, 5A-5B, and 6A-6B, and 7A described above, the host node 110 and the peripheral node 120 are configured to trigger shifting in SDI bits and trigger shifting out SDO bits based on an shift clock signals SCLK 240A, 240B that include a plurality of successive first shift clock edges 250A, 250B, and a plurality of second shift clock edges 260A, 260B separated from one another by a first time difference 230A, 230B.

As shown by the generated shift clock signal SCLK 240A, in the example of FIG. 7B, the host node 110 is configured to operate according to traditional serial communications, to shift out SDO bits responsive to the first shift clock edges 250A, and shift in SDO bits responsive to the second shift clock edges 260A, such that the host node 110 shifts out SDO bits separated from shifting in the SDI bits by the first time difference 230A.

According to the example of FIG. 7B, the peripheral node 120 is configured to operate differently than according to a traditional serial communications protocol. According to the example of FIG. 7B, the peripheral node 120 triggers shifting in SDI bits separated from when the peripheral node 120 triggers shifting out of SDO bits by a second time difference 238 that is longer than the first time difference 230B by changing when the peripheral node 120 shifts out SDO bits relative to the first shift clock edges 250B and when the peripheral node 120 shifts in SDI bits relative to the second shift clock edges 260B. For example, as shown in FIG. 7B, the peripheral node 120 triggers shifting in SDI bits after applying a known delay 272 after the second shift clock edge 260B. In addition, as also shown in FIG. 7B, the peripheral node 120 triggers shifting out SDO bits a predetermined time 282 before the first shift clock edges 250B, for example by applying a known delay 276 after the second shift clock edges 260B. In some examples, the host node 110 and the peripheral node 120 are configured to apply the respective second time difference 238 to accommodate propagation delays 109 imposed on signals between the host node 110 and the peripheral node 120, for example where the propagation delay 109 is larger than the first time differences 230A, 230B. For example, the known delays 272, 276 may be selected such that if a frequency of the shift clock signal SCLK 240A, 240B is increased (i.e., the first time differences 230A, 230B Are reduced), SDI bits are shifted in at a time when the SDI bits are stable.

FIG. 7C is a timing diagram showing a shift clock signal SCLK 240A generated by a host node 110, and a shift clock signal SCLK 240B received by a peripheral node 120 according to some embodiments. Like the examples of FIGS. 4A-4D, 5A-5B, and 6A-6B, and 7A-7B described above, the host node 110 and the peripheral node 120 are configured to trigger shifting in SDI bits and trigger shifting out SDO bits based on an shift clock signals SCLK 240A, 240B that include a plurality of successive first shift clock edges 250A, 250B, and a plurality of second shift clock edges 260A, 260B separated from one another by a first time difference 230A, 230B.

According to the example of FIG. 7C, both the host node 110 and the peripheral node 120 are configured to operate differently than according to a traditional serial communications protocol. According to the example of FIG. 7C, both the host node 110 and the peripheral node 120 are configured to adjust when they trigger the shifting in of SDI bits and trigger the shifting in of SDO bits relative to the respective first and second edges 250A-250B, 260A, 260B. According to the example of FIG. 7B, the peripheral node 120 triggers shifting in SDI bits separated from when the peripheral node 120 triggers shifting out of SDO bits by a second time difference 238 that is longer than the first time difference 230B by changing when the peripheral node 120 shifts out SDO bits relative to the first shift clock edges 250B and when the peripheral node 120 shifts in SDI bits relative to the second shift clock edges 260B.

As shown in FIG. 7C, the host node 110 triggers shifting in SDI bits separated from when the host node 110 triggers shifting out of SDO bits by a second time difference 236 that is longer than the first time difference 230A, for example by triggering the shifting in of SDI bits after applying a known delay 272 after the second shift clock edge 260A. In addition, the host node 110 triggers shifting out SDO bits a predetermined time 282 before the first shift clock edges 250A, for example by applying a known delay 276 after the second shift clock edges 260A.

As also shown in FIG. 7C, the peripheral node 120 triggers shifting in SDI bits separated from when the peripheral node 120 triggers shifting out of SDO bits by a second time difference 238 that is longer than the first time difference 230B for example by triggering the shifting in of SDI bits after applying a known delay 272 after the second shift clock edge 260A. In addition, the peripheral node 120 triggers the shifting out of SDO bits a predetermined time 282 before the first shift clock edges 250B, for example by applying a known delay 276 after the second shift clock edges 260B. In some examples, the host node 110 and the peripheral node 120 are configured to apply the respective second time difference 236, 238 to accommodate propagation delays 109 imposed on signals between the host node 110 and the peripheral node 120, for example where the propagation delay 109 is larger than the first time differences 230A, 230B. For example, the known delays 272, 276 may be selected such that if a frequency of the shift clock signal SCLK 240A, 240B is increased (i.e., the first time differences 230A, 230B Are reduced), SDI bits are shifted in at a time when the SDI bits are stable.

In some examples, a communications system 100 may be configured such that a host node 110, peripheral node(s) 120, or both are configured to the shifting in of SDI bits separated from triggering the shifting out of SDO bits by a second time difference 232, 233, 234, 235, 236, 238. In some examples, the same second time difference 232, 233, 234, 235, 236, 238 is used across the host node 110 and/or respective peripheral node(s) 120, for example to accommodate a longest overall propagation delay 109A plus 109B on communicated signals. In other examples, the host node 110 and/or peripheral node(s) 120 may use different second time differences 232, 233, 234, 235, 236, 238 to communicate with different peripheral nodes 120.

In the examples of FIGS. 4A-4D, 5A-5B, 6A-6B, and 7A-7C, the respective delays 272, 274, 276, and 278 are shown applied by one or both of the peripheral node 120 and the host node 110. In some examples, when applied by a host node 110, the respective delays 272, 274, 276, and 278 may be substantially similar. In other examples, the respective delays 272, 274, 276, and 278 may be different when applied by the host node 110 than when applied by the peripheral node 120.

Figure 8A:
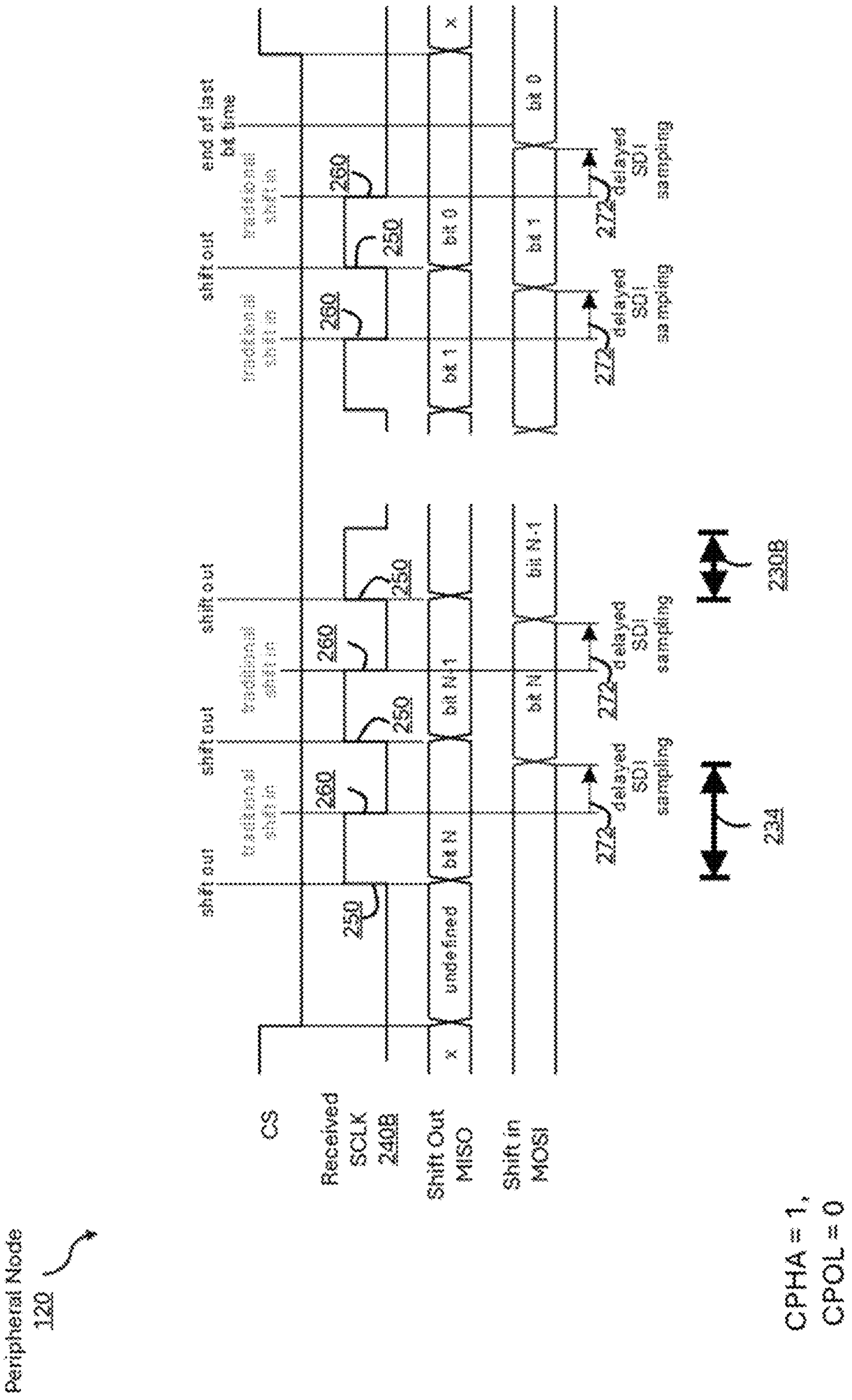
FIGS. 8A and 8B are timing diagrams that show operations of a peripheral node of a system configured to communicate using a serial peripheral interface (SPI) protocol according to some embodiments.
Figure 8B:
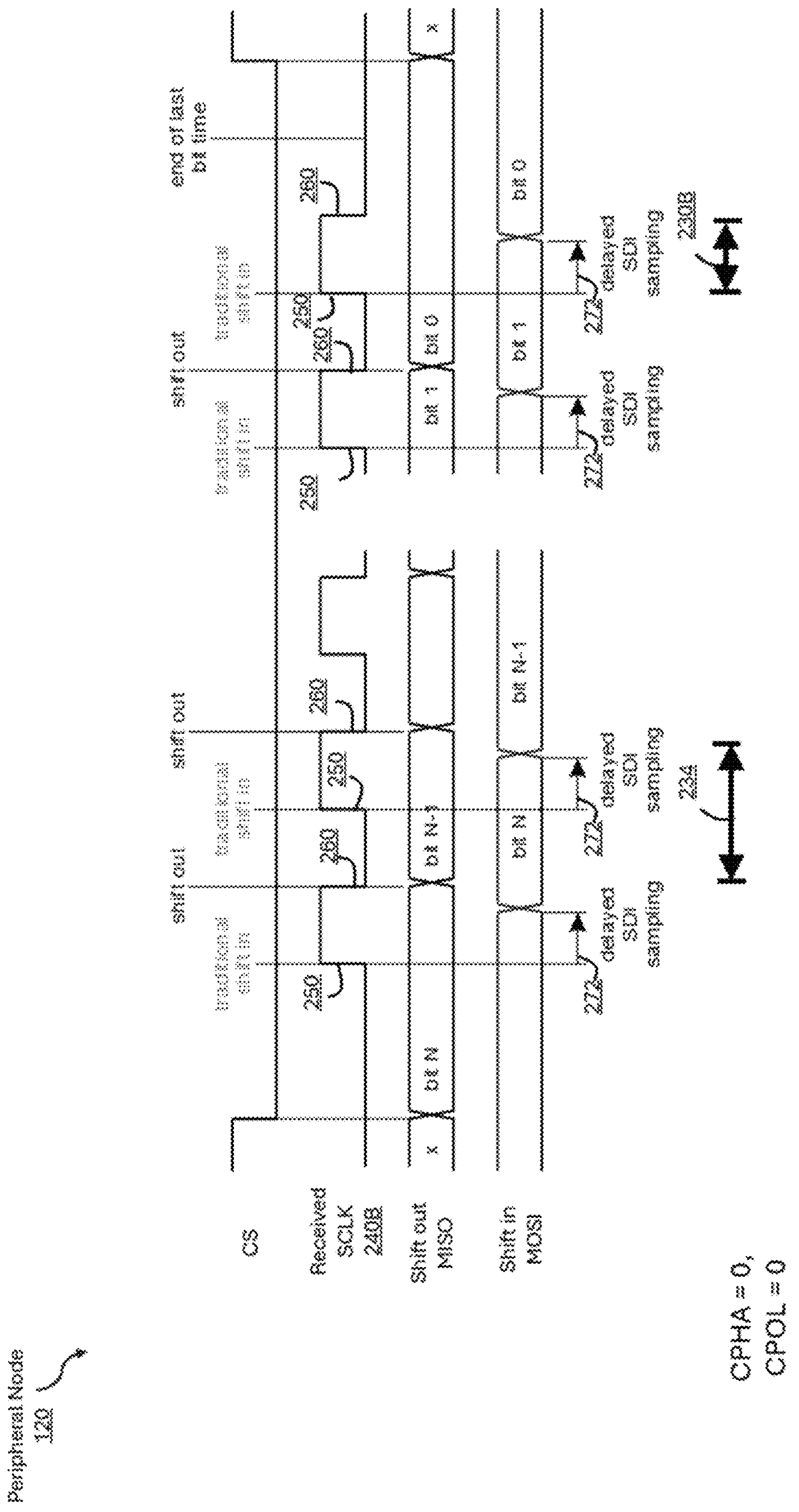

FIGS. 8A and 8B are timing diagrams that show a peripheral node 120 of system 100 configured to communicate using a serial peripheral interface (SPI) protocol according to some embodiments. The examples of FIGS. 8A and 8B correspond to the example of FIG. 4A applied to a peripheral node 120 coupled to a host node 110 through chip select, SCLK, MOSI, and MISO signals according to a communications topology as shown in the example of FIG. 1. When the topology is an ideal star topology, the delay 272 may be extended to a maximum of the first time difference 230, i.e., substantially equal or nearly equal to a the first time period 230A, 230B. In a real application with parasitic effects influencing the propagation delays of the SCLK, MISO, and MOSI signals, in some examples, all signals and edges may not be propagated symmetrically to each other. Accordingly, one signal or edge may be propagated faster or slower than another signal or edge. Especially for a daisy chain topology, asymmetric propagation delay may occur. As a consequence, the known delay 272 may be selected to be shorter than the first time difference 230B.

From the perspective of the peripheral node 120, the MOSI bits shown in FIGS. 8A and 8B correspond to the SDI bits referenced in FIGS. 4A and 4B. From the perspective of the peripheral node 120, the MISO bits shown in FIG. 8A correspond to the SDO bits referenced in FIGS. 4A and 4B.

According to the example of FIGS. 8A and 8B, the peripheral node 120 is configured to alternate between shifting in MOSI bits and shifting out MISO bits based on a shift clock signal SCLK 240A, which includes a plurality of successive first shift clock edges 250 separated from a plurality of second shift clock edges 260 by a first time difference 230B.

In the example of FIG. 8A, the peripheral node 120 configured to operate with a setting CPHA=1, according to which the peripheral node 120 starts communicating by shifting out undefined data with the CS signal becoming active, shifts out a first bit N responsive to a first shift clock signal edge 250, and shifts in a first bit N with a second shift clock signal edge 260, and continuing to alternate between shifting out and shifting in bits until a shifting in and shifting out a last bit 0. In the example of FIG. 8B, the peripheral node 120 operates with the setting CPHA=0, according to which the peripheral node 120 starts communicating a message by shifting out bit N responsive to the CS signal being activated, and traditionally shifting in a bit N responsive to a a first shift clock signal edge 250, and continuing to alternate between shifting out and shifting in bits until a shifting in and shifting out a last bit 0.

In the examples of FIGS. 8A and 8B, the peripheral node 120 is configured to operate with a setting CPOL=0, according to which the first shift clock edges 250 are rising edges of the shift clock signal SCLK, and the second shift clock edges 260 are falling edges of the shift clock signal SCLK. Other examples, the peripheral node 120 is configured to operate with a setting CPOL=1, according to which the first shift clock edges 250 are falling edges of the shift clock signal SCLK, and the second shift clock edges 260 are rising edges of the shift clock signal SCLK.

According to the example of FIGS. 8A and 8B, the peripheral node 120 is configured to operate akin to the example of FIG. 4A, and shift in MOSI bits (SDI bits) separated from shifting out MISO bits (SDO bits) by a second time difference 234 that is longer than the first time difference 230B, substantially equal to or slightly less than a full period 290 of the shift clock signal SCLK 240B (e.g., around twice the first time difference 230B). As shown in FIGS. 8A and 8B, the peripheral node 120 is configured to trigger shifting in MOSI bits at a different time than shifting in is triggered for a traditional peripheral node 120. To shift in the MOSI bits separated from shifting out MISO bits by the second time difference 234 as shown, the peripheral node 120 applies a known delay 272 responsive to the shift clock edges triggering the shifting in of MOSI bits (second shift clock edges 260 in FIG. 8A, first shift clock edges in FIG. 8B) with a duration substantially equal to or nearly as long as the first time difference 230B as shown in the FIG. 4A example, such that the MISO bits are shifted out separated from shifting in the MOSI bits by the second time difference 234.

In some examples, delaying the shifting out of MISO bits (SDO bits) by the known delay 272 causes the peripheral node 120 to trigger shifting out a current MISO bit at the same time or immediately after shifting in a previous MOSI bit, e.g. at substantially the same time or shortly after as the first shift clock edges 250 (for CPHA=0) or the second shift clock edges 260 (for CPHA=1). For example, as shown in FIGS. 8A and 8B, the peripheral node 120 shifts out a MISO bit N−1 at nearly the same time as triggering shifting in a MOSI bit N, shifts out a MISO bit N−2 at nearly the same time as shifting in a MOSI bit N−1, and so on until the peripheral node 120 shifts out a MISO bit 0 at the same time as shifting in a MOSI bit 1, and shifts in a MOSI bit 0 at an end of the message.

Figure 9A:
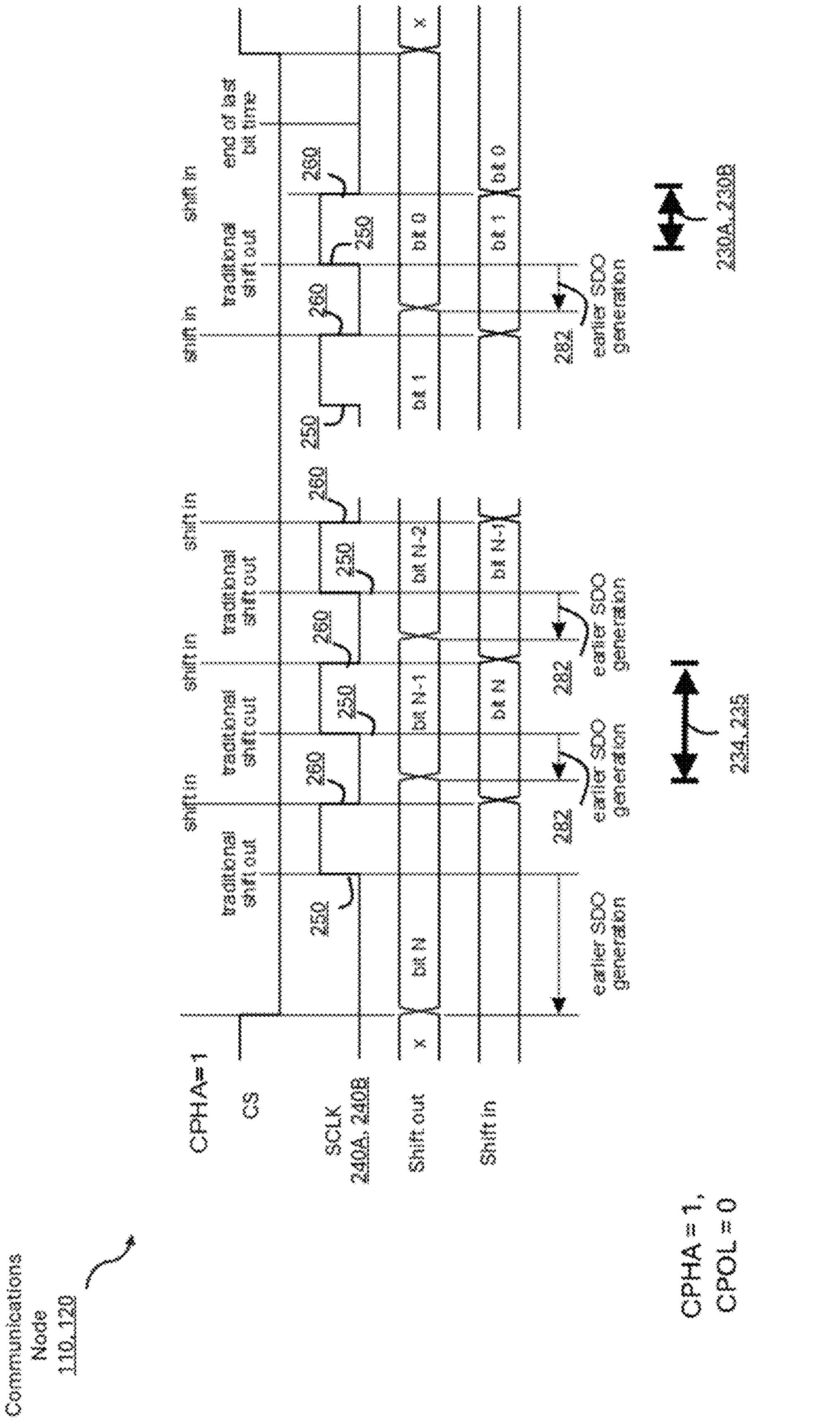
FIGS. 9A and 9B are timing diagrams that show operations of a communications node of a system configured to communicate using a serial peripheral interface (SPI) protocol according to some embodiments.
Figure 9B:
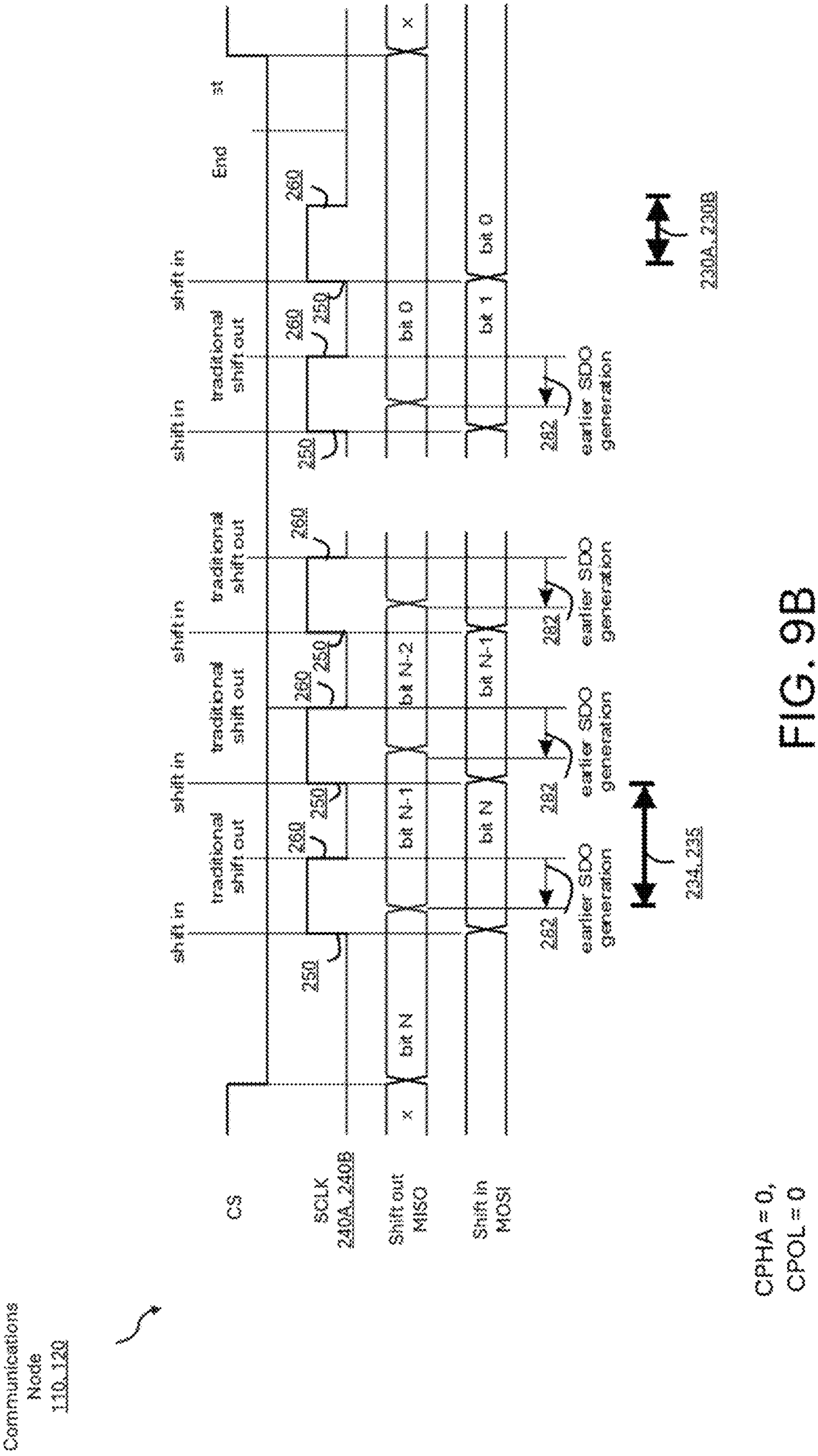

FIGS. 9A and 9B are timing diagrams that show a communications node (i.e., a peripheral node 120 or a host node 110) of system 100 configured to communicate using a serial peripheral interface (SPI) protocol according to some embodiments. The example of FIG. 9A corresponds to the example of FIGS. 4C and 5A. If the communications node is a peripheral node 120, the shifted out bits shown in FIGS. 9A and 9B correspond to MISO/SDO bits, and the shifted in bits correspond to MOSI/SDI bits referenced in FIGS. 4A-4D. If the communications node is a host node 110, the shifted out bits shown in FIGS. 9A and 9B correspond to MOSI/SDO bits, and the shifted in bits correspond to MISO/SDI bits referenced in FIGS. 5A and 5B.

According to the example of FIGS. 9A and 9B, the communications node is configured to alternate between shifting out bits and shifting in bits based on a shift clock signal SCLK 240A, 240B, which includes a plurality of successive first shift clock edges 250 separated from a plurality of second shift clock edges 260 by a first time difference 230.

In the example of FIG. 9A, the communications node configured to operate with a setting CPHA=1, according to which the communications node starts communicating by shifting out undefined data with the CS signal becoming active, shifts out a first bit N responsive to a first shift clock signal edge 250, and shifts in a first bit N with a second shift clock signal edge 260, and continuing to alternate between shifting out and shifting in bits until a shifting out and shifting in a last bit 0. In the example of FIG. 9B, the communications node operates with the setting CPHA=0, according to which the communications node starts communicating a message by shifting out bit N responsive to the CS signal being activated, and traditionally shifting in a bit N responsive to a first shift clock signal edge 250, and continuing to alternate between shifting out and shifting in bits until shifting out and shifting in a last bit 0.

In an example, the peripheral node 120 may trigger shifting out an SDO bit before the traditional shift clock edge, such as the second shift clock edge 260 (with CPHA=0, see 9B) or the first shift clock edge 250 (with CPHA=1, see 9A). Shifting out an SDO bit earlier than at the traditional shift clock edge may mean that a reference edge occurs earlier than the traditional shift clock edge as a trigger for the shifting out of an SDO bit. For the first SDO bit (bit N), this trigger may be the activation of signal CS. For other SDO bits after the first SDO bit N (e.g., bits N−1 to 0 in the FIGS. 9A and 9B examples), this trigger may be a previous first shift clock edge 250 or a previous second shift clock edge 260. In an ideal example, shifting out an SDO bit may be triggered responsive to a previous second shift clock edge 260. In some examples, due to asymmetric propagation delays (e.g., due to parasitic effects), a known delay 272, 276 may be applied after a previous event (a CS signal edge, first shift clock edge 250, second shift clock edge 260) before shifting out an SDO bit.

In the example of FIGS. 9A and 9B, the communications node is configured to operate with a setting CPOL=0, according to which the first shift clock edges 250 are rising edges of the shift clock signal SCLK 240A, 240B, and the second shift clock edges are falling edges of the shift clock signal SCLK 240A, 240B. In other examples, the communications node is configured to operate with a setting CPOL=1, according to which the first shift clock edges 250 are falling edges of the shift clock signal SCLK 240A, 240B, and the second shift clock edges 260 are rising edges of the shift clock signal SCLK 240A, 240B. In the example of FIGS. 9A, 9B a first SDI bit N is shifted out responsive to the CS signal being activated.

According to the example of FIGS. 9A, the communications node is configured to operate akin to the examples of FIGS. 4C and 5A, and shift out SDO bits separated from shifting in bits SDI bits by a second time difference 235 that is longer than the first time difference 230A, 230B, and specifically substantially equal to or nearly as long as a full period 290 of the shift clock signal SCLK 240A, 240B (e.g., around twice or nearly twice the first time difference 230 if the SCLK signal is symmetric) in the FIG. 9A example. To shift out SDO bits separated from shifting in SDI bits by a second time difference 235 as shown, the communications node may apply a known delay 276 such that the SDI bits are shifted out separated from shifting in the SDO bits (a predetermined time 282 before the first shift clock edges 250) by the second time difference 235.

As shown in the example of FIGS. 9A and 9B, the communications node is configured to shift out a current SDO bit at substantially the same time as shifting in a previous SDI bit, e.g. at substantially the same time or slightly before as the first shift clock edges 250 or second shift clock edges 260. For example, as shown in FIGS. 9A and 9B, the communications node shifts out a SDO bit N−1 at around the same time as shifting in an SDI bit N−2, shifts out an SDO bit N−2 at around the same time as shifting in an SDI bit N−1, and so on until the communications node shifts out an SDO bit 0 at around the same time as shifting in an SDI bit 1, and shifts in an SDI bit 0 at an end of the message.

FIG. 10 is a flow diagram that depicts one example of a method of operating a serial communications node according to some embodiments. As shown in FIG. 10, at step 1001, the method includes alternating between triggering the shifting out of an SDO bit and triggering the shifting in of an SDI bit relative to a first shift clock edge 250, 250A, 250B separated from a second shift clock edge 260, 260A, 260B by a first time difference 230A, 230B. As shown in FIG. 10, at step 1002, the method further includes triggering the shifting in of the SDI bit separated from triggering the shifting out of the SDO bit by a second time difference 232, 233, 234, 235, 236, 238 that is greater than the first time difference 230A, 230B.

In some examples, the second time difference 232, 233, 234, 235, 236, 238 has a duration selected to accommodate a propagation delay 109 imparted on the shift clock signal SCLK 240A, 240B. In some examples, the second time difference 234, 235 is substantially equal to or slightly less than a full period 290 of the shift clock signal SCLK 240A, 240B (e.g., substantially equal to twice the first time difference 230, or slightly less than twice the first time difference 230).

In some examples, the serial communications node is a peripheral node 120 and the method further includes triggering the shifting in of the SDI bit the second time difference 232, 234 after the triggering the shifting out of the SDO bit. In some examples, the method further includes applying a known delay 272, 274 after the second shift clock edge 260A, 260B before shifting in the SDI bit. In some examples, the method further includes shifting out a current SDO bit at the same time as or immediately after triggering shifting in a previous SDI bit.

In other examples, the serial communications node is a peripheral node or a host node, and the method further includes triggering the shifting out of the SDO bit the second time difference 233, 235 before triggering the shifting in of the SDI bit. In some examples, the method includes applying a known delay 276, 278 after the second shift clock edge 260A, 260B before shifting out the SDO bit.

In other examples, the method includes triggering, by a peripheral node 120, the shifting in of the SDI bit the second time difference after triggering the shifting out of the SDO bit, and triggering, by a host node, the shifting out of the SDO bit the second time difference before triggering the shifting in of the SDI bit.

In some examples, the method includes triggering, by a host node 110, the shifting in of the SDI bit the second time difference after triggering the shifting out of the SDO bit, and triggering, by a peripheral node 120, the shifting out of the SDO bit the second time difference before triggering the shifting in of the SDI bit.

In some examples, the method includes triggering, by a peripheral node 120, the shifting in of the SDI bit the second time difference after triggering the shifting out of the SDO bit, and triggering, by the peripheral node 120, the shifting out of the SDO bit the second time difference before triggering the shifting in of the SDI bit.

In some examples, the method includes triggering, by a host node 110, the shifting in of the SDI bit the second time difference after triggering the shifting out of the SDO bit, and triggering, by the host node 110, the shifting out of the SDO bit the second time difference before triggering the shifting in of the SDI bit.

Clauses

Clause 1. A method, comprising: alternating between triggering shifting out of an SDO bit and triggering shifting in of an SDI bit relative to a first shift clock edge separated from a second shift clock edge of a shift clock signal SCLK by a first time difference; and triggering the shifting in of the SDI bit separated from triggering the shifting out of the SDO bit by a second time difference that is longer than the first time difference.

Clause 2. The method of clause 1, further comprising: by a peripheral node, triggering the shifting in of the SDI bit the second time difference after triggering the shifting out of the SDO bit.

Clause 3. The method of clause 2, wherein triggering the shifting in of the SDI bit the second time difference after triggering the shifting out of the SDO bit comprises applying, by the peripheral node, a known delay after the second shift clock edge before triggering the shifting in of the SDI bit.

Clause 4. The method of any of clauses 1-3, further comprising: triggering the shifting out of the SDO bit the second time difference before triggering the shifting in of the SDI bit.

Clause 5. The method of clause 4, wherein triggering the shifting out of the SDO bit the second time difference before triggering the shifting in of the SDI bit comprises applying a known delay after the second shift clock edge before triggering the shifting out of the SDO bit.

Clause 6. The method of any of clauses 1-5, wherein the second time difference has a duration selected to accommodate a propagation delay imparted on the shift clock signal SCLK.

Clause 7. The method of any of clauses 1-6, further comprising: triggering the shifting out of a current SDO bit at substantially the same time or immediately after triggering the shifting in of a previous SDI bit.

Clause 8. The method of any of clauses 1-7, wherein the second time difference is substantially equal to or slightly less than a full period of the shift clock signal SCLK.

Clause 9. The method of any of clauses 1-8, wherein the first shift clock edge and the second shift clock edge are successive edges of the shift clock signal SCLK separated by the first time difference.

Clause 10. The method of any of clauses 1-9, further comprising: triggering, by a peripheral node, the shifting in of the SDI bit the second time difference after triggering the shifting out of the SDO bit; and triggering, by a host node, the shifting out of the SDO bit the second time difference before triggering the shifting in of the SDI bit.

Clause 11. The method of any of clauses 1-9, further comprising: triggering, by a host node, the shifting in of the SDI bit the second time difference after triggering the shifting out of the SDO bit; and triggering, by a peripheral node, the shifting out of the SDO bit the second time difference before triggering the shifting in of the SDI bit.

Clause 12. The method of any of clauses 1-9, further comprising: triggering, by a peripheral node the shifting in of the SDI bit the second time difference after triggering the shifting out of the SDO bit; and triggering, by the peripheral node, the shifting out of the SDO bit the second time difference before triggering the shifting in of the SDI bit.

Clause 13. The method of any of clauses 1-9, further comprising: triggering, by a host node, the shifting in of the SDI bit the second time difference after triggering the shifting out of the SDO bit; and triggering, by the host node, the shifting out of the SDO bit the second time difference before triggering the shifting in of the SDI bit.

Clause 14. A communications device configured to: alternate between triggering shifting out of an SDO bit and triggering shifting in of an SDI bit relative to a first shift clock edge separated from a second shift clock edge of a shift clock signal SCLK by a first time difference; and trigger the shifting in of the SDI bit separated from the triggering the shifting out of the SDO bit by a second time difference that is longer than the first time difference.

Clause 15. The communications device of clause 14, wherein the communications device is a peripheral node configured to: trigger the shifting in of the SDI bit the second time difference after triggering the shifting out the SDO bit.

Clause 16. The communications device of clause 15, wherein the peripheral node is configured to: apply a known delay after the second shift clock edge before triggering the shifting in of the SDI bit.

Clause 17. The communications device of any of clauses 14-17, wherein the communications device is configured to: trigger the shifting out of the SDO bit the second time difference before triggering the shifting in of the SDI bit.

Clause 18. The communications device of clause 17, wherein the communications device is configured to: apply a known delay after the second shift clock edge before triggering the shifting out of the SDO bit.

Clause 19. The communications device of any of clauses 14-18, wherein the second time difference has a duration selected to accommodate a propagation delay.

Clause 20. The communications device of any of clauses 14-19, wherein the communications device is configured to: trigger the shifting out of a current SDO bit at the same time as or immediately after triggering the shifting in of a previous SDI bit.

Clause 21. The communications device of any of clauses 14-20 wherein the second time difference is substantially equal to or slightly less than a full period of the SCLK signal.

Clause 22. The communications device of any of clauses 14-21, wherein the first shift clock edge and the second shift clock edge are successive edges of the shift clock signal SCLK separated by the first time difference.

Clause 23. The communications device of clause 14, wherein the communications device is further configured to: trigger the shifting in of the SDI bit the second time difference after triggering the shifting out of the SDO bit; and trigger the shifting out of the SDO bit the second time difference before triggering the shifting in of the SDI bit.

Clause 24. A system, comprising: a host node; and a peripheral node configured to: alternate between triggering shifting out of an SDO bit and triggering shifting in of an SDI bit relative to a first shift clock edge separated from a second shift clock edge by a first time difference; and trigger the shifting in of the SDI bit separated from triggering the shifting out of the SDO bit by a second time difference that is longer than the first time difference.

Clause 25. The system of clause 23, wherein the host node is configured to: alternate between triggering shifting out of an SDO bit and triggering shifting in of an SDI bit relative to the first shift clock edge separated from the second shift clock edge by the first time difference; and trigger the shifting in of an SDI bit separated from triggering the shifting out of an SDO bit by the second time difference.

Clause 26. The system of any of clauses 24 and 25, wherein one or more of the host node and the peripheral node are configured to: trigger the shifting out of the SDO bit the second time difference before triggering the shifting in of the SDI bit.

Clause 27. The system of any of clauses 24-26, wherein the peripheral node is configured to: trigger the shifting in of the SDI bit the second time difference after triggering the shifting out of the SDO bit.

Clause 28. The system of any of clauses 24-27, wherein the peripheral node is configured to trigger the shifting in of the SDI bit the second time difference after triggering the shifting out of the SDO bit, and the host node is configured to trigger the shifting out of the SDO bit the second time difference before triggering the shifting in of the SDI bit.

Clause 29. The system of any of clauses 24-27, wherein the host node is configured to trigger the shifting in of the SDI bit the second time difference after triggering the shifting out of the SDO bit, and to trigger the shifting out of the SDO bit the second time difference before triggering the shifting in of the SDI bit.

Clause 30. The system any of clauses 24-27, wherein the peripheral node is configured to trigger the shifting in of the SDI bit the second time difference after triggering the shifting out of the SDO bit, and to trigger the shifting out of the SDO bit the second time difference before triggering the shifting in of the SDI bit.

Clause 31. The system of any of clauses 24-27, wherein the peripheral node and the host node are configured to trigger the shifting in of the SDI bit the second time difference after triggering the shifting out of the SDO bit, and to trigger the shifting out of the SDO bit the second time difference before triggering the shifting in of the SDI bit.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A method, comprising:

alternating between triggering shifting out of a Serial Data Out (SDO) bit and triggering shifting in of a Serial Data In (SDI) bit relative to a first shift clock edge separated from a second shift clock edge of a shift clock signal SCLK by a first time difference; and triggering the shifting in of the SDI bit separated from triggering the shifting out of the SDO bit by a second time difference that is longer than the first time difference.

2. The method of claim 1, further comprising:
by a peripheral node, triggering the shifting in of the SDI bit the second time difference after triggering the shifting out of the SDO bit.

3. The method of claim 2, wherein triggering the shifting in of the SDI bit the second time difference after triggering the shifting out of the SDO bit comprises applying, by the peripheral node, a known delay after the second shift clock edge before triggering the shifting in of the SDI bit.

4. The method of claim 1, further comprising:
triggering the shifting out of the SDO bit the second time difference before triggering the shifting in of the SDI bit.

5. The method of claim 4, wherein triggering the shifting out of the SDO bit the second time difference before triggering the shifting in of the SDI bit comprises applying a known delay after the second shift clock edge before triggering the shifting out of the SDO bit.

6. The method of claim 1, wherein the second time difference has a duration selected to accommodate a propagation delay.

7. The method of claim 1, further comprising:
triggering the shifting out of a current SDO bit at substantially the same time or immediately after triggering the shifting in of a previous SDI bit.

8. The method of claim 1, wherein the second time difference is substantially equal to or slightly less than a full period of the SCLK signal.

9. The method of claim 1, wherein the first shift clock edge and the second shift clock edge are successive edges of the shift clock signal SCLK separated by the first time difference.

10. The method of claim 1, further comprising:
triggering, by a peripheral node, the shifting in of the SDI bit the second time difference after triggering the shifting out of the SDO bit; and
triggering, by a host node, the shifting out of the SDO bit the second time difference before triggering the shifting in of the SDI bit.

11. The method of claim 1, further comprising:
triggering, by a host node, the shifting in of the SDI bit the second time difference after triggering the shifting out of the SDO bit; and
triggering, by a peripheral node, the shifting out of the SDO bit the second time difference before triggering the shifting in of the SDI bit.

12. The method of claim 1, further comprising:
triggering, by a peripheral node the shifting in of the SDI bit the second time difference after triggering the shifting out of the SDO bit; and
triggering, by the peripheral node, the shifting out of the SDO bit the second time difference before triggering the shifting in of the SDI bit.

13. The method of claim 1, further comprising:
triggering, by a host node, the shifting in of the SDI bit the second time difference after triggering the shifting out of the SDO bit; and
triggering, by the host node, the shifting out of the SDO bit the second time difference before triggering the shifting in of the SDI bit.

14. A communications device configured to:
alternate between triggering shifting out of a Serial Data Out (SDO) bit and triggering shifting in of a Serial Data In (SDI) bit relative to a first shift clock edge separated from a second shift clock edge of a shift clock signal SCLK by a first time difference; and
trigger the shifting in of the SDI bit separated from the triggering the shifting out of the SDO bit by a second time difference that is longer than the first time difference.

15. The communications device of claim 14, wherein the communications device is a peripheral node configured to:
trigger the shifting in of the SDI bit the second time difference after triggering the shifting out the SDO bit.

16. The communications device of claim 15, wherein the peripheral node is configured to:
apply a known delay after the second shift clock edge before triggering the shifting in of the SDI bit.

17. The communications device of claim 14, wherein the communications device is configured to:
trigger the shifting out of the SDO bit the second time difference before triggering the shifting in of the SDI bit.

18. The communications device of claim 17, wherein the communications device is configured to:
apply a known delay after the second shift clock edge before triggering the shifting out of the SDO bit.

19. The communications device of claim 14, wherein the second time difference has a duration selected to accommodate a propagation delay.

20. The communications device of claim 14, wherein the communications device is configured to:
trigger the shifting out of a current SDO bit at the same time as or immediately after triggering the shifting in of a previous SDI bit.

21. The communications device of claim 14, wherein the second time difference is substantially equal to or slightly less than a full period of the SCLK signal.

22. The communications device of claim 14, wherein the first shift clock edge and the second shift clock edge are successive edges of the shift clock signal SCLK separated by the first time difference.

23. The communications device of claim 14, wherein the communications device is further configured to:
trigger the shifting in of the SDI bit the second time difference after triggering the shifting out of the SDO bit; and
trigger the shifting out of the SDO bit the second time difference before triggering the shifting in of the SDI bit.

24. A system, comprising:
a host node; and
a peripheral node configured to:
alternate between triggering shifting out of a Serial Data Out (SDO) bit and triggering shifting in of a Serial Data In (SDI) bit relative to a first shift clock edge separated from a second shift clock edge by a first time difference; and
trigger the shifting in of the SDI bit separated from triggering the shifting out of the SDO bit by a second time difference that is longer than the first time difference.

25. The system of claim 24, wherein the host node is configured to:
alternate between triggering shifting out of an SDO bit and triggering shifting in of an SDI bit relative to the first shift clock edge separated from the second shift clock edge by the first time difference; and
trigger the shifting in of an SDI bit separated from triggering the shifting out of an SDO bit by the second time difference.

26. The system of claim 24, wherein one or more of the host node and the peripheral node are configured to:

trigger the shifting out of the SDO bit the second time difference before triggering the shifting in of the SDI bit.

27. The system of claim 24, wherein the peripheral node is configured to:

trigger the shifting in of the SDI bit the second time difference after triggering the shifting out of the SDO bit.

28. The system of claim 24, wherein the peripheral node is configured to trigger the shifting in of the SDI bit the second time difference after triggering the shifting out of the SDO bit, and the host node is configured to trigger the shifting out of the SDO bit the second time difference before triggering the shifting in of the SDI bit.

29. The system of claim 24, wherein the host node is configured to trigger the shifting in of the SDI bit the second time difference after triggering the shifting out of the SDO bit, and to trigger the shifting out of the SDO bit the second time difference before triggering the shifting in of the SDI bit.

30. The system of claim 24, wherein the peripheral node is configured to trigger the shifting in of the SDI bit the second time difference after triggering the shifting out of the SDO bit, and to trigger the shifting out of the SDO bit the second time difference before triggering the shifting in of the SDI bit.

31. The system of claim 24, wherein the peripheral node and the host node are configured to trigger the shifting in of the SDI bit the second time difference after triggering the shifting out of the SDO bit, and to trigger the shifting out of the SDO bit the second time difference before triggering the shifting in of the SDI bit.

* * * * *